United States Patent [19]
Paik et al.

[11] Patent Number: 5,910,818
[45] Date of Patent: Jun. 8, 1999

[54] IMAGE RESTORATION SYSTEM FOR A SINGLE CHARGE COUPLED DEVICE VIDEO CAMERA

[75] Inventors: Joon-ki Paik; Woon Na, both of Seoul, Rep. of Korea

[73] Assignee: Samasung Electronics Co., Ltd., Kyungki-do, Rep. of Korea

[21] Appl. No.: 08/644,481

[22] Filed: May 10, 1996

[30] Foreign Application Priority Data

May 10, 1995 [KR] Rep. of Korea ........................ 95-11468

[51] Int. Cl.⁶ ................................................. H04N 5/228
[52] U.S. Cl. .............................................. 348/222; 348/34
[58] Field of Search .................................... 348/222, 266, 348/645, 708, 713, 630, 631, 609, 610, 661, 662, 663, 664, 665, 666, 667, 668, 669, 670, 607, 624, 30, 32, 34, 62; 382/162, 167; 358/518

[56] References Cited

U.S. PATENT DOCUMENTS 4,839,721 6/1989 Abdulwahab et al. ................. 358/518
5,321,529 6/1994 Funada ..................................... 358/500
5,467,123 11/1995 Zeevi et al. .............................. 348/34

OTHER PUBLICATIONS

Gonzalez et al., Digital Image Processing; 1992; pp. 148–156 and 375–379.

Primary Examiner—Tuan V. Ho
Attorney, Agent, or Firm—Sughrue, Mion, Zinn Macpeak & Seas, PLLC

[57] ABSTRACT

An image restoration system for a single CCD color video camera which comprises decorrelation modules, restoration modules and a multiplexer. The decorrelation modules are for receiving degraded RGB component signals image-processed by the single CCD and outputting the RGB component signals decorrelated color components between individual channels. The restoration modules receive the RGB component signals from the decorrelation modules, restore a frequency component lost in the channel and output the RGB component signals. Thus, signal detected by a single CCD is processed, compensated for degradation and restored to an original state.

32 Claims, 15 Drawing Sheets

FIG. 3
PRIOR ART

| S1 | S2 | S1 | S2 |
|----|----|----|----|
| G  | Mg | G  | Mg |
| Cy | Ye | Cy | Ye |
| Mg | G  | Mg | G  |
| Cy | Ye | Cy | Ye |
| G  | Mg | G  | Mg |
| Cy | Ye | Cy | Ye |

N-1, N, N+1

ODD FIELD   EVEN FIELD

FIG. 4
PRIOR ART

| LINE | S1    | S2    | S1    | S2    |
|------|-------|-------|-------|-------|
| N-1  | G+Cy  | Mg+Ye | G+Cy  | Mg+Ye |
| N    | Mg+Cy | G+Ye  | Mg+Cy | G+Ye  |
| N+1  | G+Cy  | Mg+Ye | G+Cy  | Mg+Ye |

ODD FIELD

| S1    | S2    | S1    | S2    |
|-------|-------|-------|-------|
| Cy+Mg | Ye+G  | Cy+Mg | Ye+G  |
| Cy+G  | Ye+Mg | Cy+G  | Ye+Mg |
| Cy+Mg | Ye+G  | Cy+Mg | Ye+G  |

EVEN FIELD

FIG. 5
PRIOR ART

| G(1, 1)       | R(1, 2)+B(1, 2) | G(1, 3)         | R(1, 4)+B(1, 4) |
|---------------|-----------------|-----------------|-----------------|
| G(2, 1)+B(2, 1) | R(2, 2)+G(2, 2) | G(2, 3)+B(2, 3) | R(2, 4)+G(2, 4) |
| R(3, 1)+B(3, 1) | G(3, 2)         | R(3, 3)+B(3, 3) | G(3, 4)         |
| G(4, 1)+B(4, 1) | R(4, 2)+G(4, 2) | G(4, 3)+B(4, 3) | R(4, 4)+G(4, 4) |

FIG. 6
PRIOR ART

|  | S1(j=1) | S2(j=2) | S1(j=3) | S2(j=4) |
|---|---|---|---|---|
| i=1 | G(1,1)+G(2, 1)+B(2, 1) | R(1, 2)+B(1, 2)+R(2, 2)+G(2, 2) | G(1,3)+G(2, 3)+B(2, 3) | R(1, 4)+B(1, 4)+R(2, 4)+G(2, 4) |
| i=2 | R(3, 1)+B(3, 1)+G(4, 1)+B(4, 1) | G(3,2)+R(4, 2)+G(4, 2) | R(3, 3)+B(3, 3)+G(4, 3)+B(4, 3) | G(3,4)+R(4, 4)+G(4, 4) |
| i=3 | G(5,1)+G(6, 1)+B(6, 1) | R(5, 2)+B(5, 2)+R(6, 2)+G(6, 2) | G(5,3)+G(6, 3)+B(6, 3) | R(5, 4)+B(5, 4)+R(6, 4)+G(6, 4) |
| i=4 | R(7, 1)+B(7, 1)+G(8, 1)+B(8, 1) | G(7,2)+R(8, 2)+G(8, 2) | R(7, 3)+B(7, 3)+G(8, 3)+B(8, 3) | G(7,4)+R(8, 4)+G(8, 4) |

FIG. 7
PRIOR ART

| ODD COLUMN OF ODD LINE | EVEN COLUMN OF ODD LINE |
|---|---|
| ODD COLUMN OF EVEN LINE | EVEN COLUMN OF EVEN LINE |

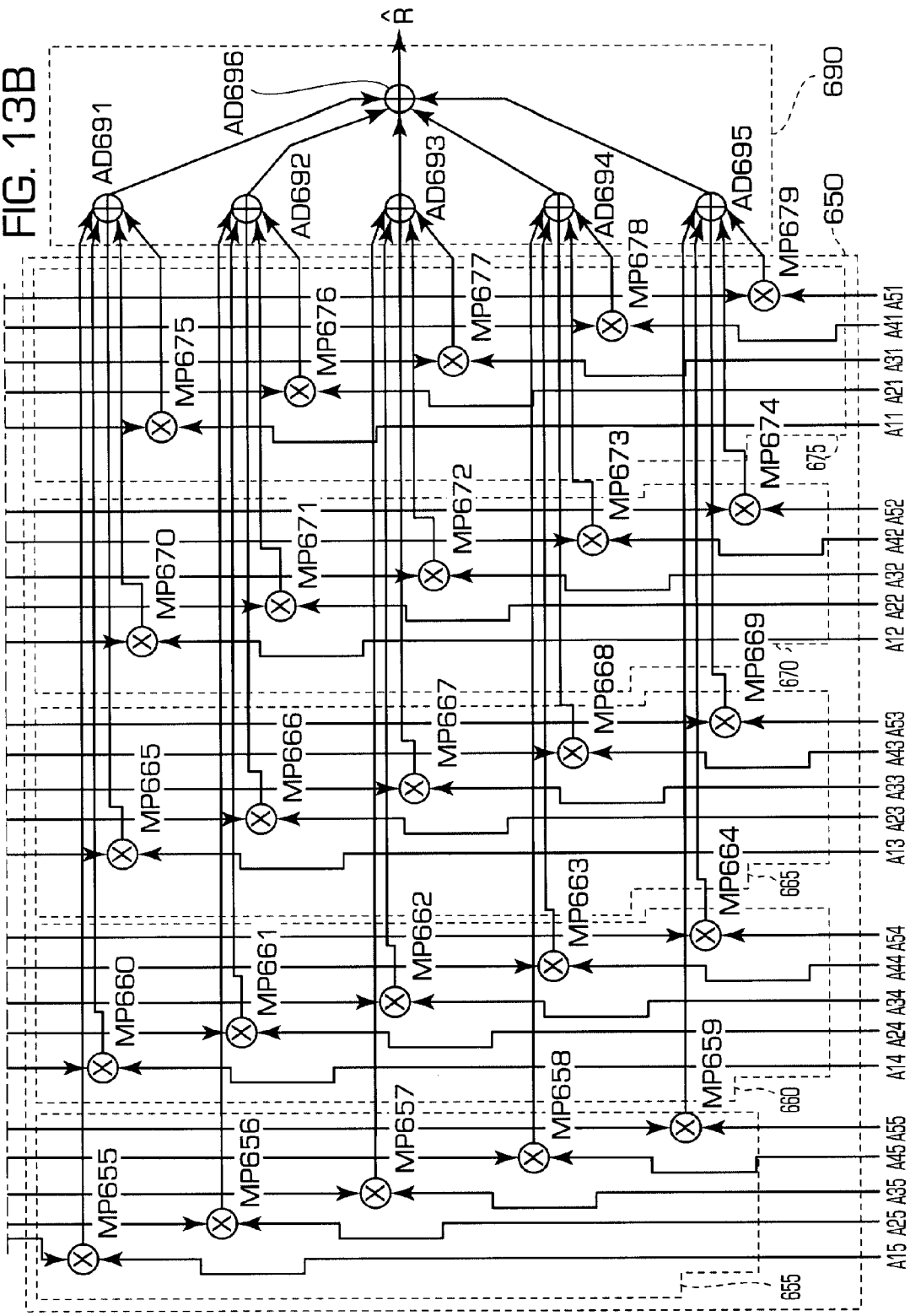

FIG. 14

| ODD COLUMN OF ODD LINE |
| EVEN COLUMN OF ODD LINE |
| ODD COLUMN OF EVEN LINE |
| EVEN COLUMN OF EVEN LINE |

FIG. 15

| $A_{11}$ | $A_{12}$ | $A_{13}$ | $A_{14}$ | $A_{15}$ |
|---|---|---|---|---|
| $A_{21}$ | $A_{22}$ | $A_{23}$ | $A_{24}$ | $A_{25}$ |
| $A_{31}$ | $A_{32}$ | $A_{33}$ | $A_{34}$ | $A_{35}$ |
| $A_{41}$ | $A_{42}$ | $A_{43}$ | $A_{44}$ | $A_{45}$ |
| $A_{51}$ | $A_{52}$ | $A_{53}$ | $A_{54}$ | $A_{55}$ |

IMAGE RESTORATION SYSTEM FOR A SINGLE CHARGE COUPLED DEVICE VIDEO CAMERA

BACKGROUND OF THE INVENTION

1. Field of the Invention

The present invention relates to an image restoration system for a single CCD (Charge Coupled Device) video camera, more particularly, an image restoration system in digital video camera for converting an optical signal to an electrical signal using a single CCD, which may process a signal detected by a single CCD, identify the degraded factors resulting from the procedure of converting the electrical signal to a luminance signal and color signals, compensate the signals for errors, and restore the signals to the original states.

2. Description of the Prior Art

A CCD (Charge Coupled Device) is an image pickup device which converts an optical signal into an electric charge and outputs the electric signal. A broadcast camera generally processes individual RGB (Red.Green.Blue) signals of an image signal with three CCDs; however, a home video camera processes a RGB signal with a single CCD controlled by time division multiplexing.

A conventional single CCD color video camera will be described with reference to the accompanying drawings.

Referring to FIG. 1, the conventional single CCD digital video camera comprises a camera part 10 which receives an optical signal from a lens module and generates a television signal; a VCR (Video Cassette Recorder) part 80 which receives and stores the television signal from the camera 10; and a television part 90 which receives and outputs the television signal to an eye view finder.

In the camera part 10, an optical signal collected by a lens module 1 passes through an optical low pass filter 2 and a color filter array 3 and is converted into an electrical signal by a single CCD module 4. In the correlated double sampling and automatic gain control module 5, the noise of the electric signal is eliminated, the gain of the signal is properly controlled depending on luminance, and the signal is outputted, in analog form with gamma correction of the signal distortion. Then, the analog to digital converter 6 converts an analog signal into a digital signal, and the digital camera signal processing module 7 generates a luminance signal and a color difference signal by digital signal processing. The luminance signal and a color difference signal are converted into digital signals by digital to analog converter 8. The multiplexer 9 generates a television signal by synthesizing the digital signals.

In the digital camera signal processing module 7 as shown in FIG. 2, generating the luminance signal Y and the color difference signal C is as follows.

The detection module 11 detects the signal from the analog to digital converter 6. The color processing module 12 then processes the signal which is composed of Cyan, Magenta, Yellow and Green components, and generates the luminance signal and the RGB signals. The color difference signal generator module 13 generates the color difference signal using the RGB signals, and the encoding module 14 encodes the luminance signal and the color difference signal. Also, timing and sync signal generation module 15 generates a sync signal which synchronizes the optical low pass filter 2, the color filter array 3, CCD module 4, the correlated double sampling and automatic gain control module 5 and the multiplexer 9.

Now, the detailed operation of color processing module 12 is as follows.

The inputted color component corresponding to the color filter array in FIG. 3 is divided into an even field and odd field component, and represents RGB components in a pixel position as shown in FIG. 5.

Two different color components represented as S1 and S2 are alternatively repeated in each line, as shown in FIG. 3, FIG. 4 and FIG. 5. The procedure for extracting the RGB components from S1 and S2 components is as follows.

For all odd and even lines, the low frequency component of the luminance signal is obtained by adding S1 to S2, as shown in Eq. (1). Eq. (2) is obtained by substituting each component in Eq. (1), and Eq. (3) is obtained by sorting Eq. (2).

$$S2 + S1 = G + Cy + Mg + Ye \quad (1)$$

$$= G + (G+B) + (R+B) + (R+G) \quad (2)$$

$$= 2R + 3G + 2B \quad (3)$$

$$= Yl \quad (4)$$

Accordingly, the low frequency component of the luminance signal (Yl) is obtained, as shown in Eq. (4). The Yl refers to low frequency component of the luminance signal, since its composition rate is similar to that of the luminance signal Y and it passes through the planar low pass filter.

Also, the difference between S2 and S1 differs for each line. In the case of the odd field, Eq. (5), (6) and (7) are obtained.

$$S2 - S1 = (Mg + Ye) - (G + Cy) \quad (5)$$

$$= 2R - G \quad (6)$$

$$= Cr \quad (7)$$

Therefore, the Cr component is obtained in the odd line of the odd field. The value of the Cr component resides between −256 and 255, and is represented in nine bits.

Similarly, Eq. (8), (9) and (10) are obtained for the even line of the even field.

$$S2 - S1 = (G + Ye) - (Mg + Cy) \quad (8)$$

$$= -(2B - G) \quad (9)$$

$$= -Cb \quad (10)$$

The value of the Cb component also resides between −256 and 255, and is represented in nine bits.

Eq. (11) to (13) are used herein among several types of the RGB matrix.

$$RED = Cr + 0.2G = 2R \quad (11)$$

$$GREEN = Yl - Cr' = 5G \quad (12)$$

$$Blue = -Cb + 0.2G = 2B \quad (13)$$

FIG. 5 illustrates the composition of the RGB signal passed through the color filter array module in FIG. 3. FIG. 6 illustrates the recomposed odd field resulted from the new type of the color filter module in FIG. 4.

Referring to FIG. 6, the Yl component of the (i, j)th pixel of the odd field is calculated in Eq. (14) using Eq. (4).

$$Yl(i,j)=S1(i,j)+S2(i,j) \qquad (14)$$

The Cr component in the odd line of the odd field is the difference between S2 and S1, calculated differently in the odd column and the even column.

Eq. (15) is obtained by using Eq. (7) for representing the Cr component of the odd column.

$$Cr1(i,j)=S2(i,j+1)-S1(i,j) \qquad (15)$$

Eq. (16) is obtained by using Eq. (7) for representing the Cr component of the even column.

$$Cr(i,j+1)=S2(i,j+1)-S1(i,j+2) \qquad (16)$$

The Cb component in the even line of the odd field differs between the odd column and the even column. The Cb component of the odd column is presented in Eq. (17) and the Cb component of the even column is presented in Eq. (18) using Eq. (10).

$$Cb(i+1,j)=S2(i+1,j+1)-S1(i+1,j) \qquad (17)$$

$$Cb(i+1,j+1)=S2(i+1,j+1)-S1(i+1,j+2) \qquad (18)$$

Since there is no Cr component in the even line and no Cb component in the odd line, the Cr component used in the even line is that of the Cr component of the preceding line and the Cb component used in the odd line is that of the Cb component of the following line, as shown in Eq. (19) and (20).

$$Cr(i+1,j)=Cr(i,j) \qquad (19)$$

$$Cb(i,j)=Cb(i+1,j) \qquad (20)$$

The resultant RGB signals are obtained by substituting Yl, Cr and Cb components from Eq. (11) to (13).

For the odd field as shown in FIG. 4, the components are different depending on the odd column of the odd line, the even column of the odd line, the odd column of the even line and the even column of the even line, i.e., the composition of the components are repeated as shown in FIG. (7).

Therefore, the impulse response is obtained from processing four pixel positions of (1,1), (1,2), (2,1) and (2,2).

Now, the Yl, Cr and Cb components of the odd field are as follows.

Eq. (21) to (24) below represent the Yl component of the odd field.

$$Yl(1,1)=S1(1,1)+S2(1,2) \qquad (21)$$

$$Yl(1,2)=S1(1,2)+S2(1,3) \qquad (22)$$

$$Yl(2,1)=S1(2,1)+S2(2,2) \qquad (23)$$

$$Yl(2,2)=S1(2,2)+S2(2,3) \qquad (24)$$

Also, Eq. (25) to (28) below represent the Cr component of the odd field, and Eq. (29) to (32) below represent the Cb component of the odd field.

$$Cr(1,1)=S2(1,2)-S1(1,1) \qquad (25)$$

$$Cr(1,2)=S2(1,2)-S1(1,3) \qquad (26)$$

$$Cr(2,1)=S2(1,2)-S1(1,1) \qquad (27)$$

$$Cr(2,2)=S2(1,2)-S1(1,3) \qquad (28)$$

$$Cb(1,1)=S2(2,2)-S1(2,1) \qquad (29)$$

$$Cb(1,2)=S2(2,2)-S1(2,3) \qquad (30)$$

$$Cb(2,1)=S2(2,2)-S1(2,1) \qquad (31)$$

$$Cb(2,2)=S2(2,2)-S1(2,3) \qquad (32)$$

Eq. (33) to (44) represent the recomposed $\overline{G'}$ components of the odd field, Eq. (45) to (53) represent the recomposed $\overline{R'}$ components of the odd field and Eq. (54) to (65) represent the recomposed $\overline{B'}$ components of the odd field.

$$\overline{G'}(1,1) = Yl(1,1) - Cr(1,1) + Cb(1,1) \qquad (33)$$

$$= 2*S1(1,1) + S2(2,2) - S1(2,1) \qquad (34)$$

$$= [R(4,2) - R(3,1)] + \qquad (35)$$

$$[2G(1,1) + 2G(2,1) + G(3,2) - G(4,1) + G(4,2)] +$$

$$[2B(2,1) - B(3,1) - B(4,1)]$$

$$\overline{G'}(1,2) = Yl(1,2) - Cr(1,2) + Cb(1,2) \qquad (36)$$

$$= 2*S1(1,3) + S2(2,2) - S1(2,3) \qquad (37)$$

$$= [R(4,2) - R(3,3)] + \qquad (38)$$

$$[2G(1,3) + 2G(2,3) + G(3,2) - G(4,3) + G(4,2)] +$$

$$[2B(2,3) - B(3,3) - B(4,3)]$$

$$\overline{G'}(2,1) = Yl(2,1) - Cr(2,1) + Cb(2,1) \qquad (39)$$

$$= S1(1,1) - S2(1,2) - 2*S2(2,2) \qquad (40)$$

$$= [2R(4,2) - R(1,2) - R(2,2)] + \qquad (41)$$

$$[G(1,1) + G(2,1) - G(2,2) - 2G(3,2) + 2G(4,2)] +$$

$$[B(2,1) - B(1,2)]$$

$$\overline{G'}(2,2) = Yl(2,2) - Cr(2,2) + Cb(2,2) \qquad (42)$$

$$= S1(1,2) - S2(1,2) - 2*S2(2,2) \qquad (43)$$

$$= [2R(4,2) - R(1,2) - R(2,2)] + \qquad (44)$$

$$[G(1,3) + G(2,3) - G(2,2) + 2G(3,2) + 2G(4,2)] +$$

$$[B(2,3) - B(1,2)]$$

$$\overline{R'}(1,1) = Cr(1,1) + 0.2\overline{B'}(1,1) \qquad (45)$$

$$= S2(1,2) - 0.6*S1(1,1) - 0.2*S2(2,2) - \qquad (46)$$

$$0.2*S1(2,1)$$

$$= [R(1,2) + R(2,2) + 0.2R(4,2) - 0.2R(3,1)] + \qquad (47)$$

$$[G(2,2) - 0.6G(1,1) - 0.6G(2,1) + 0.2G(3,2) +$$

$$0.2G(4,2) - 0.2G(4,1)] +$$

$$[B(1,2) - 0.6B(2,1) - 0.2B(4,1) - 0.2B(3,1)]$$

$$\overline{R'}(1,2) = Cr(1,2) + 0.2\overline{B'}(1,2) \qquad (48)$$

$$= S2(1,2) - 0.6*S1(1,3) - 0.2*S2(2,2) - \qquad (49)$$

-continued $$0.2 * S1(2, 3)$$

$$= [R(1, 2) + R(2, 2) + 0.2R(4, 2) - 0.2R(3, 3)] + \quad (50)$$
$$[G(2, 2) - 0.6G(1, 3) - 0.6G(2, 3) + 0.2G(3, 2) +$$
$$0.2G(4, 2) - 0.2G(4, 3)] +$$
$$[B(1, 2) - 0.6B(2, 3) - 0.2B(4, 3) - 0.2B(3, 3)]$$

$$\overline{R'}(2, 1) = Cr(2, 1) + 0.2\overline{B'}(2, 1) \quad (51)$$
$$= 0.4 * S2(2, 2) + 0.8 * S1(1, 2) - 0.8 * S1(1, 1) \quad (52)$$
$$= [0.8R(1, 2) + 0.8R(2, 2) + \quad (53)$$
$$0.4R(4, 2) - 0.2R(3, 3)] +$$
$$[0.8G(2, 2) - 0.6G(1, 1) - 0.8G(2, 1) + 0.4G(3, 2) +$$
$$0.4G(4, 2)] +$$
$$[B(1, 2) - 0.6B(2, 3) - 0.2B(4, 3) - 0.2B(3, 3)]$$

$$\overline{B'}(1, 1) = 0.2\overline{G'}(1, 1) - Cb(1, 1) \quad (54)$$
$$= 0.4 * S1(1, 1) - 0.8 * S2(2, 2) + 0.8 * S1(1, 3) \quad (55)$$
$$= [0.8R(3, 1) - 0.8R(4, 2)] + \quad (56)$$
$$[0.4G(1, 1) + 0.4G(2, 1) - 0.8G(3, 2) -$$
$$0.8G(4, 2) + 0.8G(4, 1)] +$$
$$[0.8B(3, 1) + 0.4B(2, 1) + 0.8B(4, 1)]$$

$$\overline{B'}(1, 2) = 0.2\overline{G'}(1, 2) - Cb(1, 2) \quad (57)$$
$$= 0.4 * S1(1, 3) - 0.8 * S2(2, 2) + 0.8 * S1(2, 3) \quad (58)$$
$$= [0.8R(3, 3) - 0.8R(4, 2)] + \quad (59)$$
$$[0.4G(1, 3) + 0.4G(2, 3) - 0.8G(3, 2) -$$
$$0.8G(4, 2) + 0.8G(4, 3)] +$$
$$[0.8B(3, 3) + 0.4B(2, 3) + 0.8B(4, 3)]$$

$$\overline{B'}(2, 1) = 0.2\overline{G'}(2, 1) - Cb(2, 1) \quad (60)$$
$$= S1(2, 1) - 0.6 * S2(2, 2) - 0.8 * S2(1, 1) + \quad (61)$$
$$0.2 * S1(1, 1)$$
$$= [R(3, 1) - 0.6R(4, 2) - 0.2R(1, 2) - 0.2R(2, 2)] + \quad (62)$$
$$[G(4, 1) - 0.6G(3, 2) - 0.6G(4, 2) -$$
$$0.2G(2, 2) + 0.2G(1, 1) + 0.2G(2, 1)] +$$
$$[B(3, 1) + B(4, 1) - 0.2B(1, 2) + 0.2B(2, 1)]$$

$$\overline{B'}(2, 2) = 0.2\overline{G'}(2, 2) - Cb(2, 2) \quad (63)$$
$$= S1(2, 3) - 0.6 * S2(2, 2) - 0.2 * S2(1, 2) + \quad (64)$$
$$0.2 * S1(1, 3)$$
$$= [R(3, 3) - 0.6R(4, 2) - 0.2R(1, 2) - 0.2R(2, 2)] + \quad (65)$$
$$[G(4, 3) - 0.6G(3, 2) - 0.6G(4, 2) -$$
$$0.2G(2, 2) + 0.2G(1, 3) + 0.2G(2, 3)] +$$
$$[B(3, 3) + B(4, 3) - 0.2B(1, 2) + 0.2B(2, 3)]$$

The recomposed $\overline{R'}$, $\overline{G'}$ and $\overline{B'}$ component signals should be recomposed in the signal shape of the field unit since they are composed of frame units, as shown above. FIG. 8 illustrates the method of recomposing the signals in field units.

The method of recomposing in FIG. 8 is as follows.

Eq. (66) to (99) represent the recomposed $\overline{R''}$ components of the odd field, Eq. (70) to (73) represent the recomposed $\overline{G''}$ components of the odd field and Eq. (74) to (77) represent the recomposed $\overline{B''}$ components of the odd field.

$$\overline{R''}(1, 1) = [2R(1, 2) + 0.2R(2, 2) - 0.2R(2, 1)] + \quad (66)$$
$$[G(1, 2) - 1.2G(1, 1) - 0.2G(2, 1) + 0.4G(2, 2)] +$$
$$[B(1, 2) - 0.6B(1, 1) - 0.4B(2, 1)]$$

$$\overline{R''}(1, 2) = [2R(1, 2) + 0.2R(2, 2) - 0.2R(2, 3)] + \quad (67)$$
$$[G(1, 2) - 1.2G(1, 3) - 0.2G(2, 3) + 0.4G(2, 2)] +$$
$$[B(1, 2) - 0.6B(1, 3) - 0.4B(2, 3)]$$

$$\overline{R''}(2, 1) = [1.6R(1, 2) + 0.4R(2, 2)] + \quad (68)$$
$$[0.8G(1, 2) - 1.6G(1, 1) + 0.8G(2, 2)] +$$
$$[0.8B(1, 2) - 0.8B(1, 1)]$$

$$\overline{R''}(2, 2) = [1.6R(1, 2) + 0.4R(2, 2)] + \quad (69)$$
$$[0.8G(1, 2) - 1.6G(1, 3) + 0.8G(2, 2)] +$$
$$[0.8B(1, 2) - 0.8B(1, 3)]$$

$$\overline{G''}(1, 1) = [2R(2, 2) - 2R(1, 2)] + [4G(1, 1) + \quad (70)$$
$$2G(2, 2) - G(2, 1)] + [B(1, 1) - B(1, 2)]$$

$$\overline{G''}(1, 2) = [2R(2, 2) - 2R(1, 3)] + [4G(1, 3) + \quad (71)$$
$$2G(2, 2) - G(2, 3)] + [2B(1, 3) - 2B(3, 3)]$$

$$\overline{G''}(2, 1) = [2R(2, 2) - 2R(1, 2)] + [2G(1, 1) + \quad (72)$$
$$4G(2, 2) - G(2, 1)] + [B(1, 1) - B(1, 2)]$$

$$\overline{G''}(2, 2) = [2R(2, 2) - 2R(1, 2)] + [2G(1, 3) + \quad (73)$$
$$4G(2, 2) - G(1, 2)] + [B(1, 3) - B(1, 2)]$$

$$\overline{B''}(1, 1) = 0.8[R(2, 1) - R(2, 2) + 0.8[G(1, 1) + \quad (74)$$
$$G(2, 1) - 2G(2, 2)] + 0.4[B(1, 1) + 4B(2, 1)]$$

$$\overline{B''}(1, 2) = 0.8[R(2, 3) - R(2, 2) + 0.8[G(1, 3) + \quad (75)$$
$$G(2, 3) - 2G(2, 2)] + 0.4[B(1, 3) + 4B(2, 3)]$$

$$\overline{B''}(2, 1) = [R(2, 1) - 0.4R(1, 2) + 0.6R(2, 2)] + \quad (76)$$
$$[0.4G(1, 1) - 0.2G(1, 2) + G(2, 1) - 1.2G(2, 2)] +$$
$$[0.2B(1, 1) - 0.2B(1, 2) - 2B(2, 1)]$$

$$\overline{B''}(2, 2) = [R(2, 3) - 0.4R(1, 2) + 0.6R(2, 2)] + \quad (77)$$
$$[0.4G(1, 3) - 0.2G(1, 2) + G(2, 3) - 1.2G(2, 2)] +$$
$$[0.2B(1, 3) - 0.2B(1, 2) - 2B(2, 3)]$$

From the above Eq. (66) to (77), since the $\overline{R''}$, $\overline{G''}$ and $\overline{B''}$ components of the odd field of the signal from the color processing module 12 are degraded with channel correlations, it is difficult to realize the original color component of the signal.

SUMMARY OF THE INVENTION

In view of the conventional approach described above, it is an object of the present invention to provide an image restoration system in a digital video camera for converting an optical signal to an electrical signal using a single CCD, which may process a signal detected by a single CCD, identify the degraded factors resulted from the procedure of converting the signal to a luminance signal and color signal, compensate the signal, and restore the signal before degrading.

BRIEF DESCRIPTION OF THE DRAWINGS

The above object and feature of the present invention will be apparent from the following description of the preferred embodiment with reference to the accompanying drawings.

FIG. 3 shows an illustration of the color filter array in FIG. 1.

FIG. 4 shows an illustration of the color filter array in FIG. 1 comprised of an odd and even field.

FIG. 5 shows an illustration of the color filter array, wherein the color filter array comprises a RGB component with reference to a frame in FIG. 3.

FIG. 6 shows an illustration of the odd field from the color filter array with reference to a frame in FIG. 5.

FIG. 7 shows an illustration of four basic impulse responses repeated in horizontal and vertical direction for the odd field.

FIGS. 13(A) and 13(B) show circuit diagrams of a first restoration module in FIG. 9.

FIG. 14 shows a diagram of positions of the coefficients in FIG. 13.

FIG. 15 shows a diagram of positions of the values of the coefficients in FIG. 13.

DETAILED DESCRIPTION OF THE PREFERRED EMBODIMENTS

Figure 1:
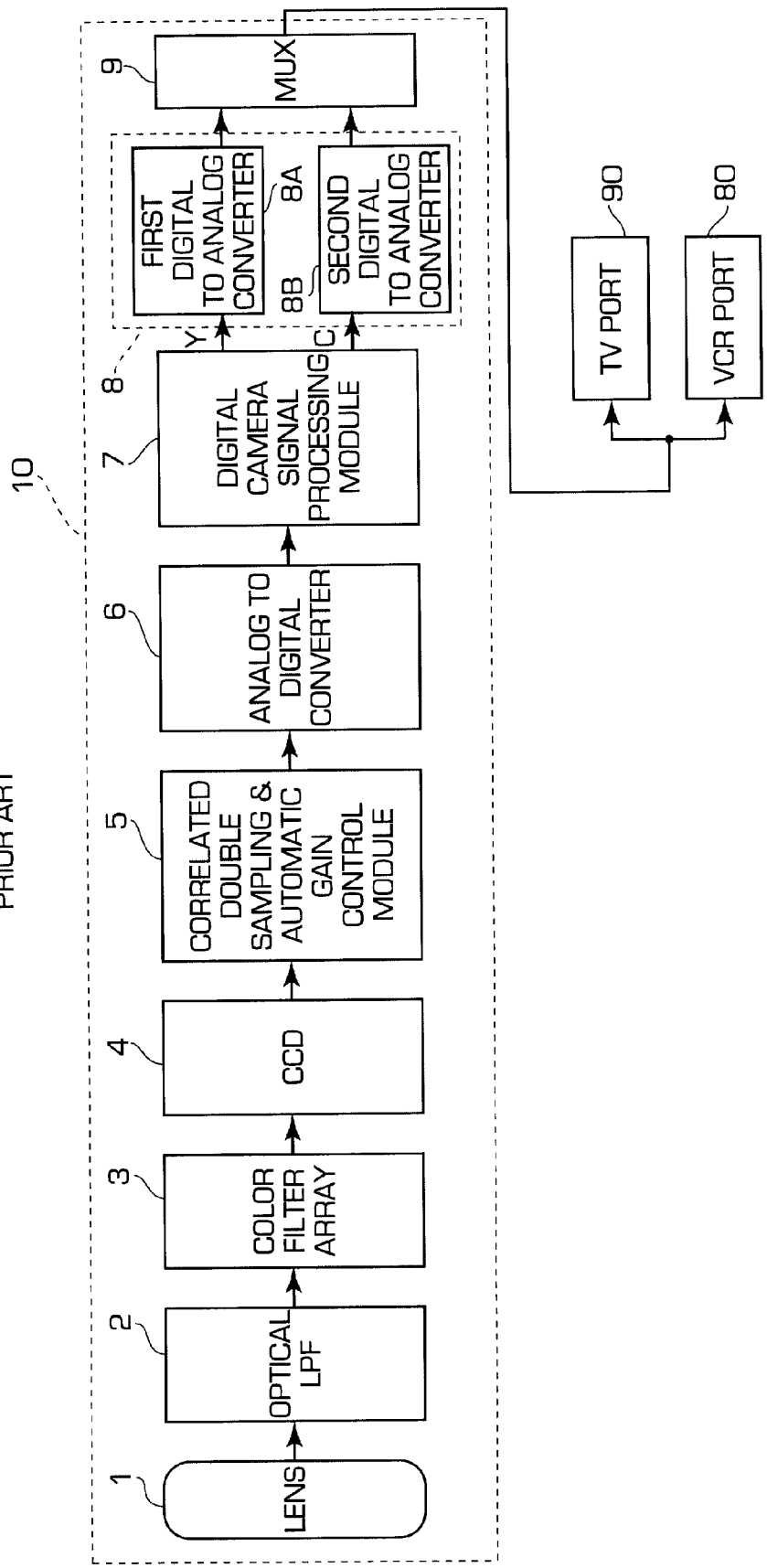
FIG. 1 is an entire block diagram of a conventional digital video camera using a single CCD.
Figure 2:
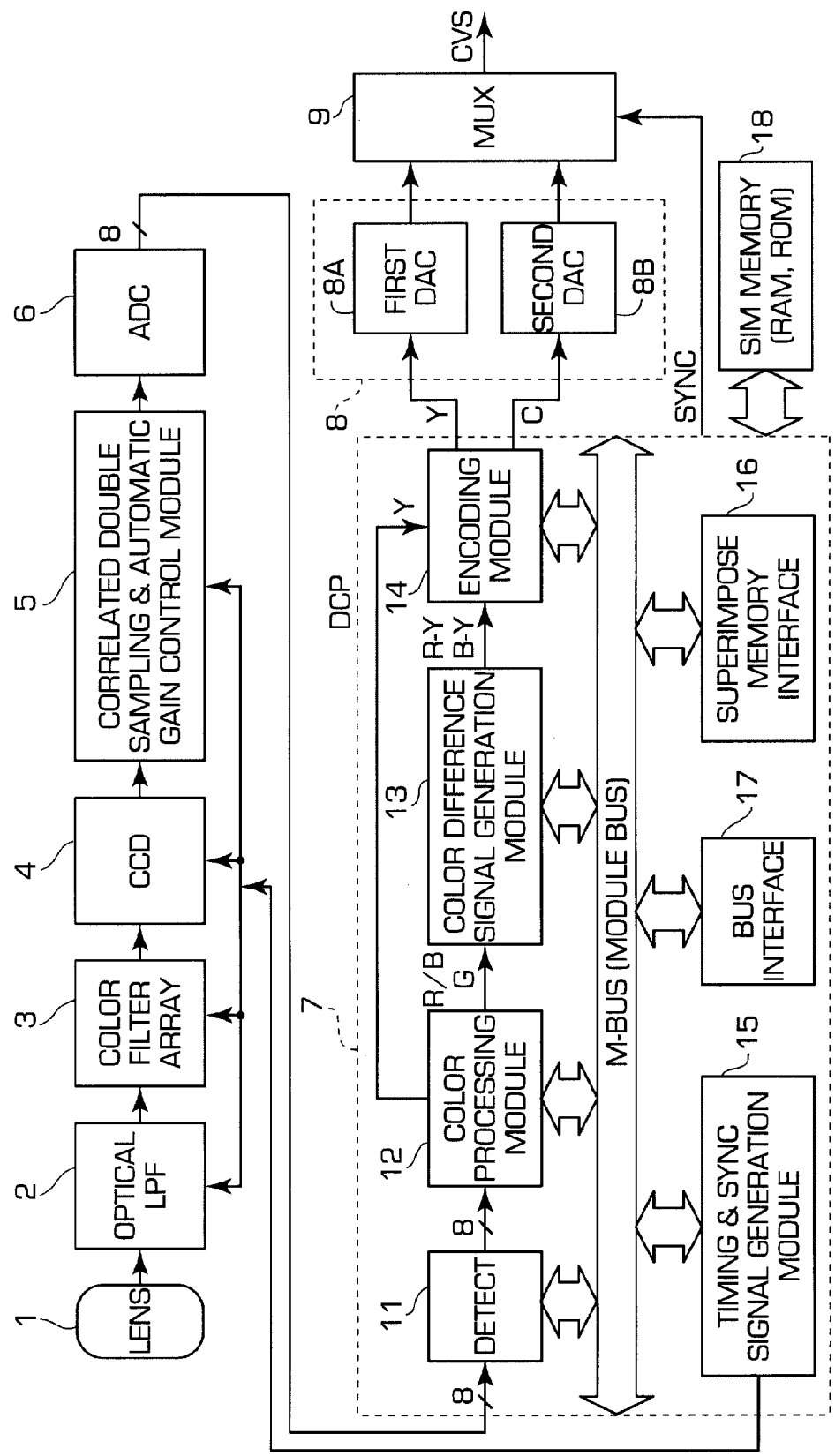
FIG. 2 is a detailed block diagram of the camera part in FIG. 1.
Figure 8:
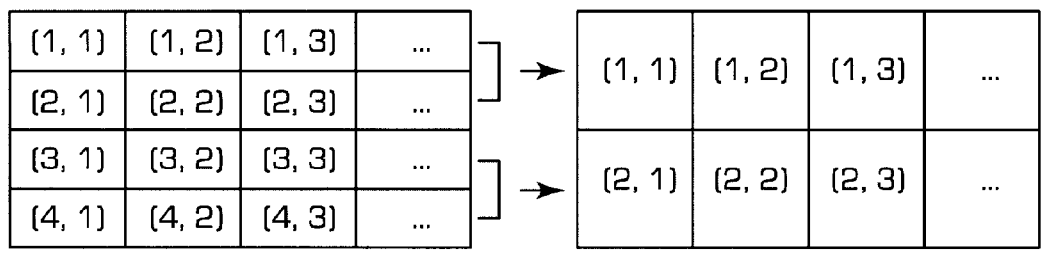
FIG. 8 shows an illustration of a method of reconstructing the frame in a field unit.

The present invention will be described in detail with reference to the accompanying drawings, beginning with FIG. 9.

An image restoration system for a single charge coupled device color video camera according to the present invention comprises a decorrelation module 100, a restoration module 500 and a multiplexer 900.

The decorrelation module 100 receives degraded RGB component signals that are image-processed by the single charge coupled device and outputs the RGB component signals decorrelated color components in individual channels. The restoration module 500 receives the RGB component signals from the decorrelation module, restoring the frequency components lost in the channels and outputting the RGB component signals. Finally, the multiplexer 900 receives the R and B component signals from the restoration module and outputs the signals alternatively.

Specifically, the decorrelation module 100 comprises a first decorrelation module 200 for receiving the degraded RGB component signals, eliminating a correlation signal in the R component signal using the G and B component signals, and outputting a pure R component signal. Decorrelation module 100 also has a second decorrelation module 300 for receiving the degraded G component signal and the R and B component signals which are decorrelated and frequency-restored, eliminating a correlation signal in the G component signal using the R and B component signals, and outputting a pure G component signal. A third decorrelation module 400 is for receiving the degraded RGB component signals, eliminating a correlation signal in the B component signal using the G and B component signals, and outputting a pure B component signal.

The first decorrelation module 200 has an R signal processing module 210 for receiving the degraded R component signal, decorrelating the color components between individual lines and outputting three R component signals ((A)–(C)). Module 200 also has a G signal processing module 230 for receiving the degraded G component signal, decorrelating the color components between individual lines and outputting four G component signals ((D)–(G)). There also is a B signal processing module 250 for receiving the degraded B component signal, decorrelating the color components between individual lines and outputting four B component signals. Finally, module 200 has a signal combination module 270 for combining the signals from the R signal processing module 210, the G signal processing module 230 and the B signal processing module 250, decorrelating the color components between individual lines and columns, and outputting the RGB component signals.

Turning now to the R signal processing module 210, there is a line memory LM211, a first delay circuit DY211 and a first amplifier AP211 for receiving the degraded R component signal. There also is a second amplifier AP212 whose input terminal is connected to the output terminal of the first delay circuit DY211. A second delay circuit DY212, whose input terminal is connected to the output terminal of the line memory LM211, and a third amplifier AP213, whose input terminal is connected to the output terminal of the second delay circuit DY212, also appear in module 210. A first adder AD211, whose first input terminal is connected to the output terminal of the second amplifier AP212 and whose second input terminal is connected to the output terminal of the third amplifier AP213, generates a summed output. A second adder AD212, whose first input terminal is connected to the output terminal of the first adder AD211 and whose second input terminal is inversely connected to the output terminal of the first amplifier AP211, generates one of the module R compound signals (A).

A third delay circuit DY213, whose input terminal is connected to the output terminal of the first delay circuit DY211, is connected to a fourth amplifier AP214 whose output terminal is connected to a third adder AD213. The third adder AD213 whose first input terminal is inversely connected to the output terminal of the fourth amplifier AP214 and whose second input terminal is connected to the output terminal of the first adder AD211, generates a second one of the module R compound signals (B).

A fifth amplifier AP215, whose input terminal is connected to the output terminal of the second delay circuit DY212, and a sixth amplifier AP216, whose input terminal is connected to the output terminal of the first delay circuit DY211, are input to a fourth adder AD214, whose output is a third one of the module R component signals (C).

The G signal processing module 230 has a line memory LM231, a first delay circuit DY231 and a first amplifier AP231 for receiving the degraded G component signal. It also has a second delay circuit DY232 whose input terminal is connected to the output terminal of the first line memory LM231, a second amplifier AP232 whose input terminal is connected to the output terminal of the first delay circuit DY231, a third amplifier AP233 whose input terminal is connected to the output terminal of the first delay circuit DY231; and a first adder AD231 whose first input terminal is connected to the output terminal of the second delay circuit DY232 and whose second input terminal is connected to the output terminal of the second amplifier AP232. The G signal processing module 230 also has a third delay circuit DY233 whose input terminal is connected to the output terminal of the first delay circuit DY231, a fifth amplifier AP235 whose input terminal is connected to the output terminal of the third delay circuit DY233, a fourth amplifier AP234 whose input terminal is connected to the output terminal of the second delay circuit DY232, and a second adder AD232 whose first input terminal is connected to the output terminal of the third amplifier AP233, whose second input terminal is connected to the output terminal of the first adder AD231 and whose third input terminal is connected to the output terminal of the fourth amplifier AP234. There also is a fourth delay circuit DY234 whose input terminal is connected to the output terminal of the second delay circuit DY232, a sixth amplifier AP236 whose input terminal is connected to the output terminal of the fourth delay circuit DY234, and a third adder AD233 whose first input terminal is connected to the output terminal of the second adder AD232 and whose second input terminal is inversely connected to the output terminals the sixth amplifier AP236. The output of the third adder is to the first G signal (D).

Also included is a seventh amplifier AP237 whose input terminal is connected to the output terminal of the fourth delay circuit DY234, and a fourth adder AD234 whose first input terminal is inversely connected to the output terminal of the fifth amplifier AP235, whose second input terminal is connected to the output terminal of the first adder AD231 and whose third input terminal is inversely connected to the output terminal of the seventh amplifier AP237. The output of the fourth adder is the second to signal (E).

The module 230 further has an eighth amplifier AP238 whose input terminal is connected to the output terminal of the line memory LM231, and a fifth adder AD235 whose first input terminal is inversely connected to the output terminal of the eighth amplifier AP238, whose second input terminal is inversely connected to the output terminal of the first amplifier AP231 and whose third input terminal is connected to the output terminal of the second delay circuit DY232. The output of the fifth adder is the third G signal (F).

Finally, there is a ninth amplifier AP239 whose input terminal is connected to the output terminal of the line memory LM231, and a sixth adder AD236 whose first input terminal is inversely connected to the output terminal of the ninth amplifier AP239 and whose second input terminal is connected to the output terminal of the first adder AD231. The output of the sixth adder is the fourth G signal (G).

Figure 10A:
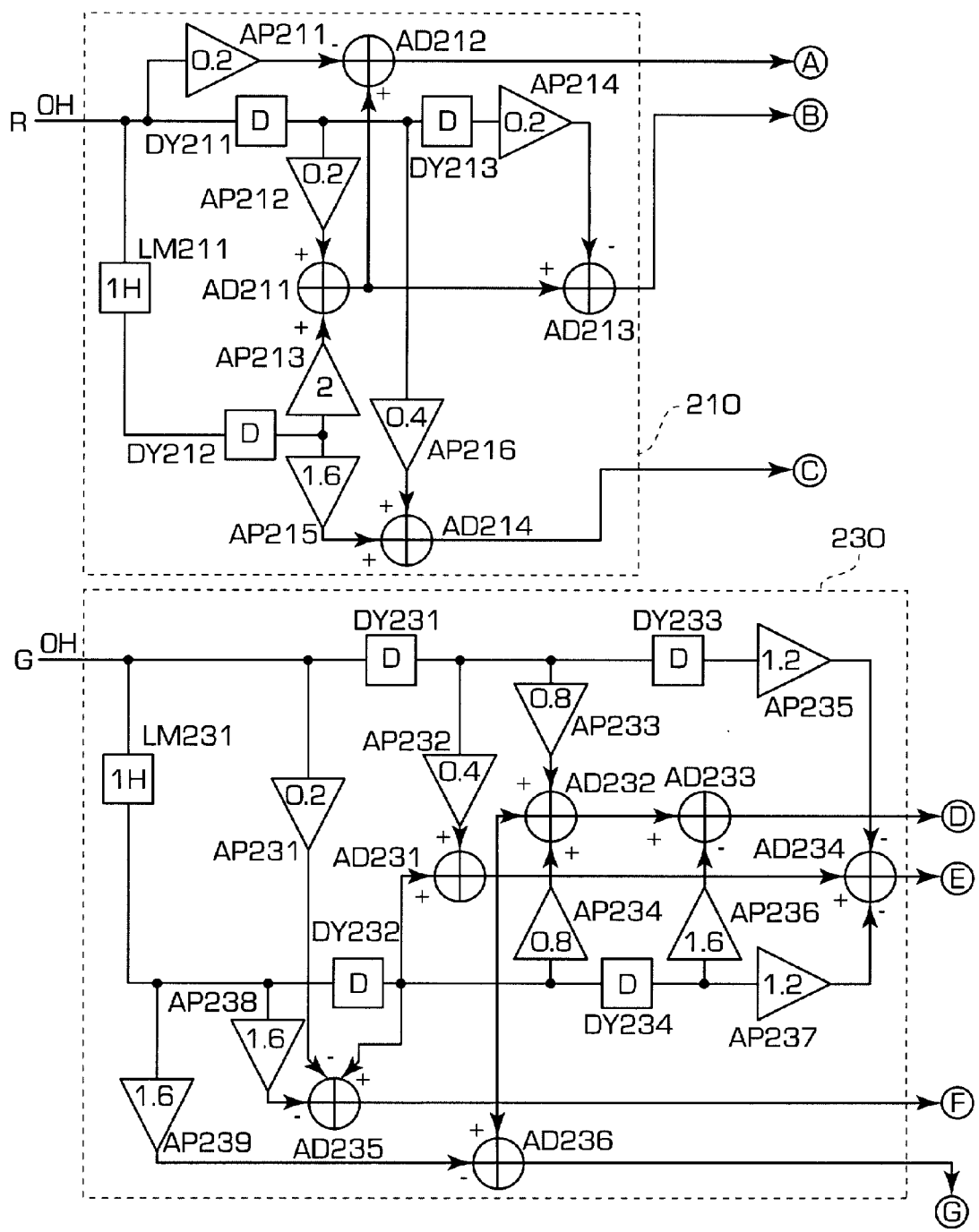
FIGS. 10(A) and 10(B) show circuit diagrams of a first decorrelation module in FIG. 9.
Figure 10B:
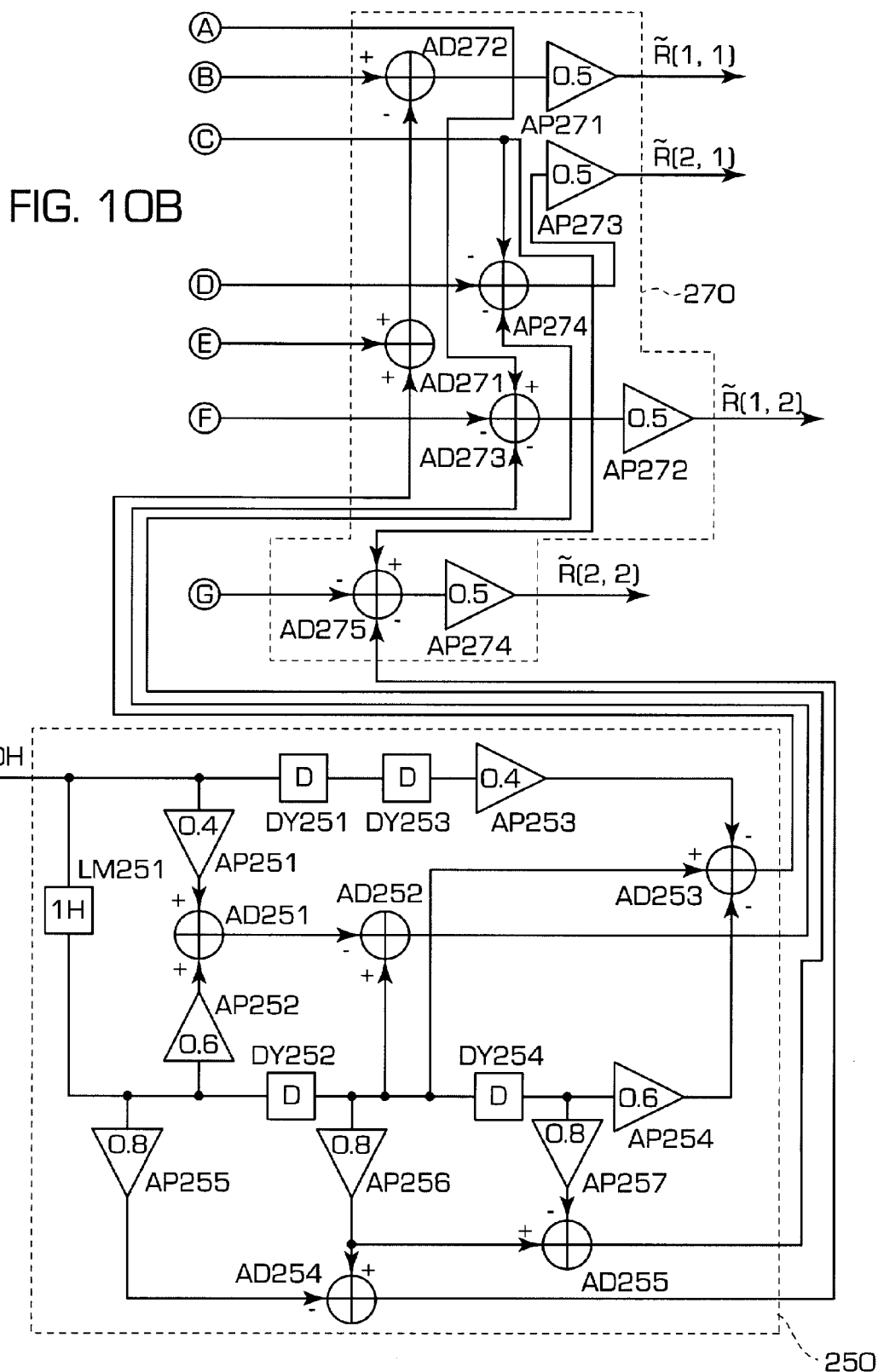

As seen in FIG. 10B, the B signal processing module 250 has a line memory LM251, a first delay circuit DY251 and a first amplifier AP251 for receiving the degraded B component signal. There also is a second amplifier AP252 whose input terminal is connected to the output terminal of the line memory LM251, a second delay circuit DY252 whose input terminal is connected to the output terminal of the line memory LM251, a third delay circuit DY253 whose input terminal is connected to the output terminal of the first delay circuit DY251, a third amplifier AP253 whose input terminal is connected to the output terminal of the third delay circuit DY253, a first adder AD251 whose first input terminal is connected to the output terminal of the first amplifier AP251 and whose second input terminal is connected to the output terminal of the second amplifier AP252; and a second adder AD252 whose first input terminal is connected to the output terminal of the second delay circuit DY252 and whose second input terminal is inversely connected to the output terminal of the first adder AD251. The output of the second adder is provided as first B input to module 270.

The B module also has a fourth delay circuit DY254 whose input terminal is connected to the output terminal of the second delay circuit DY252, a fourth amplifier AP254 whose input terminal is connected to the output terminal of the fourth delay circuit DY254 and a third adder AD253 whose first input terminal is inversely connected to the output terminal of the third amplifier AP253, whose second input terminal is connected to the output terminals of the second delay circuit DY252 and whose third input terminal is inversely connected to the output terminal of the fourth amplifier AP254. The third adder provides a second B input to module 270.

Module 250 also has a fifth amplifier AP255 whose input terminal is connected to the output terminal of the line memory LM251, a sixth amplifier AP256 whose input terminal is connected to the output terminal of the second delay circuit DY252, and a fourth adder AD254 whose first input terminal is inversely connected to the output terminal of the fifth amplifier AP255 and whose second input terminal is connected to the output terminal of the sixth amplifier AP256. The output of the fourth adder is a third B signal that is input to module 270.

Finally, there is a seventh amplifier AP257 whose input terminal is connected to the output terminal of the fourth delay circuit DY254; and a fifth adder AD255 whose first input terminal is inversely connected to the output terminal of the seventh amplifier AP257 and whose second input terminal is connected to the output terminal of the sixth amplifier AP256. The output of the fifth adder is a fourth B signal.

The signal combination module 270 seen in FIG. 10B: has a first adder AD271 whose first input terminal is connected to the fourth adder AD234 of the G signal processing module 230 and whose second input terminal is connected to the third adder AD253 of the B signal processing module 250. There also is a second adder AD272 whose first input terminal is connected to the third adder AD213 of the R signal processing module 210 and whose second input terminal is inversely connected to the output terminal of the first adder AD271.

Also included is a third adder AD273 whose first input terminal is connected to the second adder AD212 of the R signal processing module 210, whose second input terminal is inversely connected to the fifth adder AD235 of the G signal processing module 230 and whose third input terminal is inversely connected to the second adder AD252 of the B signal processing module 270.

Module 270 also has a fourth adder AD274 whose first input terminal is connected to the fourth adder AD214 of the R signal processing module 210, whose second input terminal is inversely connected to the third adder AD232 of the G signal processing module 230 and whose third input terminal is inversely connected to the fifth adder AD255 of the B signal processing module 250.

Finally, there is a fifth adder AD275 whose first input terminal is connected to the first adder AD214 of the R signal processing module 210, whose second input terminal is inversely connected to the sixth adder AD236 of the G signal processing module 230 and whose third input terminal is inversely connected to the fourth adder AD254 of the B signal processing module 250.

As seen in FIG. 10B, certain adder outputs are provided as R signals at different fixed positions. For example, a first amplifier AP271 whose input terminal is connected the output terminal of the second adder AD272, produces signal R(1,1), a second amplifier AP272 whose input terminal is connected the output terminal of the third adder AD273 produces signal R(2,1), a third amplifier AP273 whose input terminal is connected the output terminal of the fourth adder AD274 produces signal R(2,1); and a fourth amplifier AP274 whose input terminal is connected the output terminal of the fifth adder AD275 produces signal R(2,2).

Figure 9:
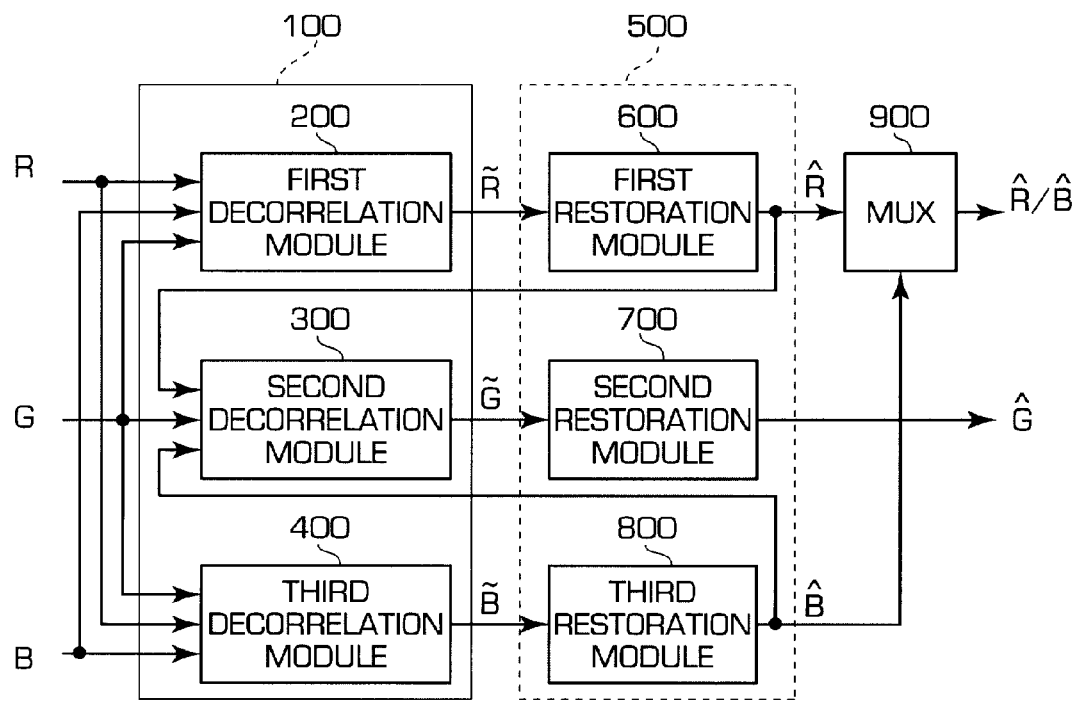
FIG. 9 is a block diagram of an image restoration system for a single CCD video camera according to the present invention.
Figure 11A:
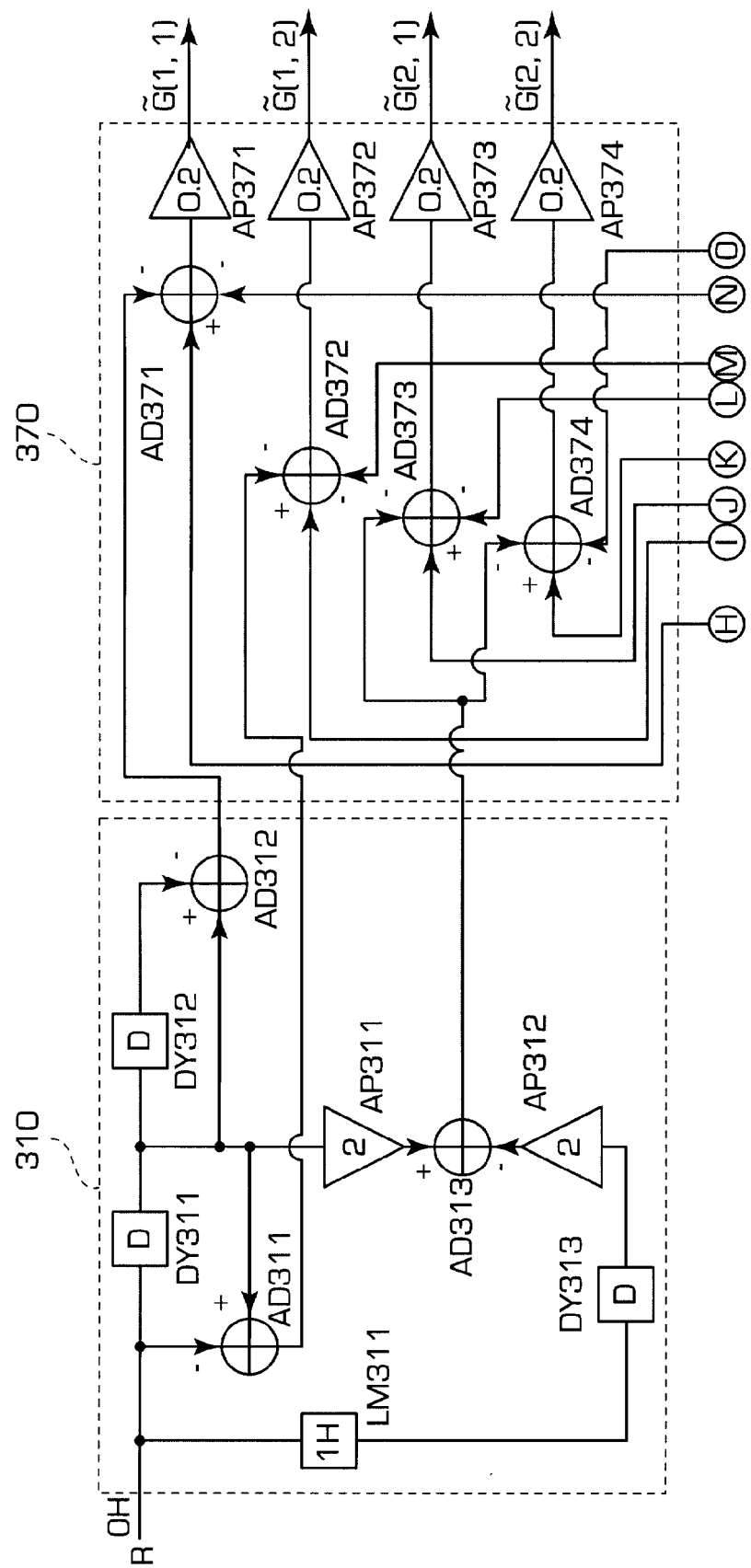
FIGS. 11(A) and 11(B) show circuit diagrams of a second decorrelation module in FIG. 9.
Figure 11B:
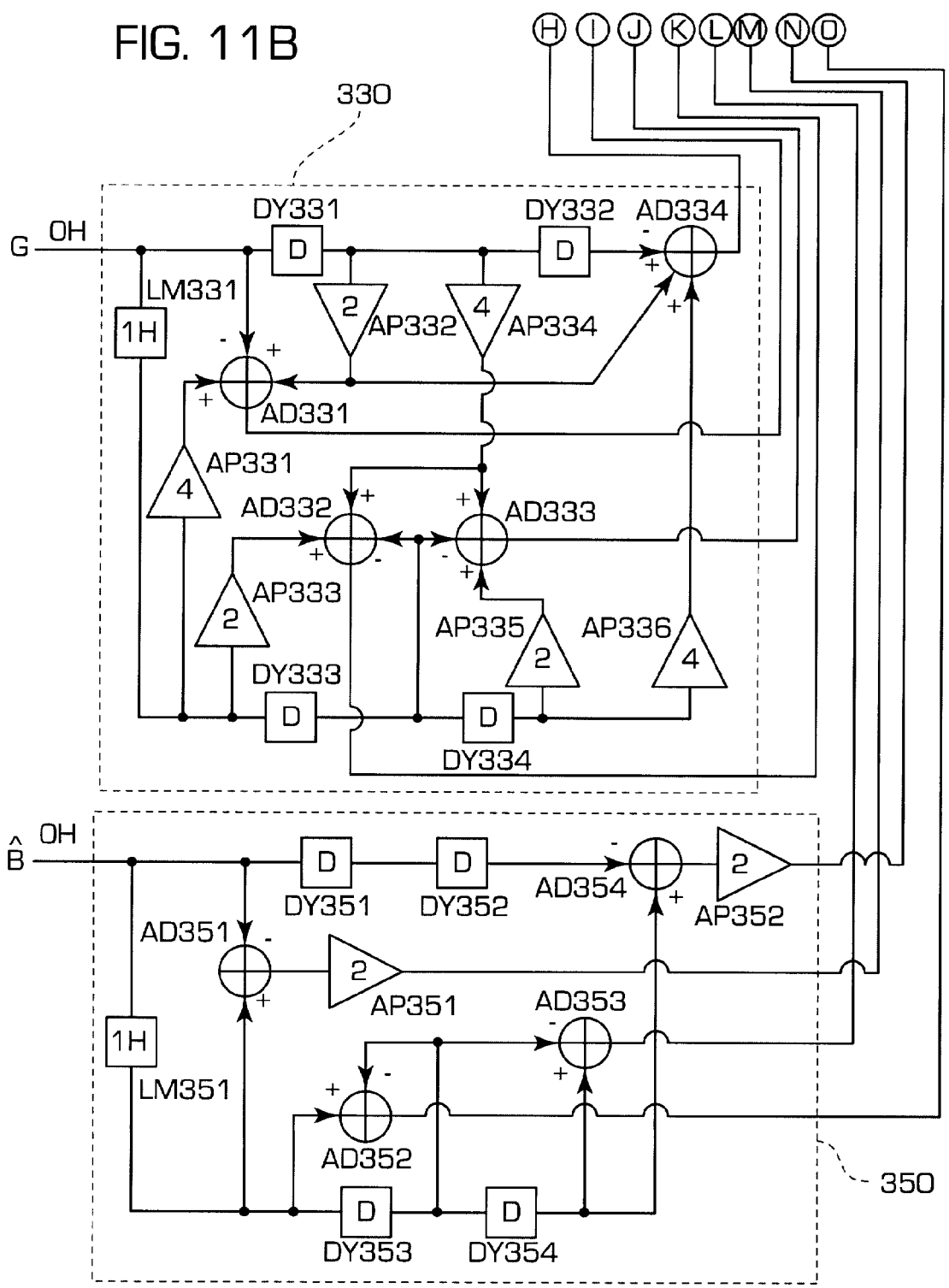

The second decorrelation module 300 from FIG. 9 comprises a R signal processing module 310 for receiving the degraded R component signal, decorrelating the color components between individual lines and outputting three R component signal, as seen in FIGS. 11A and 11B, a G signal processing module 330 for receiving the degraded G component signal, decorrelating the color components between individual lines and outputting four G component signal; a B signal processing module 350 for receiving the degraded B component signal, decorrelating the color components between individual lines and outputting four B component signal; and a signal combination module 370 for combining the signals from the R signal processing module 310, the G signal processing module 330 and the B signal processing module 350, decorrelating the color components between individual lines and columns, and outputting the RGB component signals.

Referring to FIG. 11A, the R signal processing module 310 has a line memory LM311 and a first delay circuit DY311 for receiving a R component signal which is decorrelated and restored with a frequency. There also is a first adder AD311 whose first input terminal inversely receives the R component signal which is decorrelated and restored with a frequency, and whose second input terminal is connected to the output terminal of the first delay circuit DY311, a second delay circuit DY312 whose input terminal is connected to the output terminal of the first delay circuit DY311, and a second adder AD312 whose first input terminal is connected to the output terminal of the first delay circuit DY311 and whose second input terminal is inversely connected to the output terminal of the second delay circuit DY312.

The module 310 also has a first amplifier AP311 whose input terminal is connected to the output terminal of the first delay circuit DY311, a third delay circuit DY313 whose input terminal is connected to the output terminal of the line memory LM311, a second amplifier AP312 whose input terminal is connected to the output terminal of the third delay circuit DY313; and a third adder AD313 whose first input terminal is inversely connected to the output terminal of the first amplifier AP311 and whose second output terminal is inversely connected to the output terminals the second amplifier AP312.

In FIG. 11B, it can be seen that the G signal processing module 330 has a line memory LM331 and a first delay circuit DY331 for receiving the degraded G component signal, a second delay circuit DY332 whose input terminal is connected to the output terminal of the first delay circuit DY331, a first amplifier AP331 whose input terminal is connected to the output terminal of the line memory LM331, a second amplifier AP332 whose input terminal is connected to the output terminal of the first delay circuit DY331; and a first adder AD331 whose first input terminal inversely receives the degraded G component signal, whose second input terminal is connected to the output terminal of the first amplifier AP331 and whose third input terminal is connected to the output of adder AD331 is the output terminal of the second amplifier AP332. There also is a third amplifier AP333 whose input terminal is connected to the output terminal of the line memory LM331, a fourth amplifier AP334 whose input terminal is connected to the output terminal of the first delay circuit DY331, a third delay circuit DY333 whose input terminal is connected to the output terminal of the line memory LM331, and a second adder AD332 whose first input terminal is connected to the output terminal of the fourth amplifier AP334, whose second input terminal is connected to the output terminal of the third amplifier AP333 and whose third input terminal is inversely connected to the output terminal of the third delay circuit DY333. Further, there is a fourth delay circuit DY334 whose input terminal is connected to the output terminal of the third delay circuit DY333, a fifth amplifier AP335 whose input terminal is connected to the output terminal of the fourth delay circuit DY334; and a third adder AD333 whose first input terminal is connected to the output terminal of the fourth amplifier AP334, whose second input terminal is inversely connected to the output terminals the third delay circuit DY333 and whose third input terminal is connected to the output terminal of the fifth amplifier AP335. Output signal (J) comes from adder AD333.

A sixth amplifier AP336 whose input terminal is connected to the output terminal of the fourth delay circuit DY334 is in module 330 as well as a fourth adder AD334 whose first input terminal is inversely connected to the output terminal of the second delay circuit DY332, whose second input terminal is connected to the output terminal of the second amplifier AP332 and whose third input terminal is connected to the output terminal of the sixth amplifier AP336. The output signal (H) is from this adder.

The B signal processing module 350 has a line memory LM351 and a first delay circuit DY351 for receiving the B component signal which is decorrelated and restored with a frequency, a second delay circuit DY352 whose input terminal is connected to the output terminal of the first delay circuit DY351, a first adder AD351 whose first input terminal inversely receives the B component signal and whose second input terminal is connected to the output terminal of the line memory LM351, and a first amplifier AP351 whose input terminal is connected to the output terminal of the first adder AD351 and providers signal (M).

Module 350 also has a third delay circuit DY353 whose input terminal is connected to the output terminal of the line memory LM351, and a second adder AD352 whose first input terminal is connected to the output terminal of the line memory LM351 and whose second input terminal is inversely connected to the output terminal of the third delay circuit DY353. The output of adder AD352 is signal (O).

A fourth delay circuit DY354, whose input terminal is connected to the output terminal of the third delay circuit DY353, and a third adder AD353, whose first input terminal is inversely connected to the output terminal of the third delay circuit DY353 and whose second output terminal is connected to the output terminals the fourth delay circuit DY354, is found in module 350. The output of adder AD352 is signal (L).

Finally, module 350 has a fourth adder AD354 whose first input terminal is inversely connected to the output terminal of the second delay circuit DY352 and whose second input terminal is connected to the output terminal of the fourth delay circuit DY354; and a second amplifier AP352 whose input terminal is connected to the output terminal of the fourth adder AD354.

In FIG. 11A, there is a signal combination module 370 which has a first adder AD371 whose first input terminal is inversely connected to the second adder AD312 of the R signal processing module 310, whose second input terminal is connected to the fourth adder AD334 of the G signal processing module 330 and whose third input terminal is inversely connected to the second amplifier AP352 of the B signal processing module 350. There also is a second adder AD372 whose first input terminal is inversely connected to the first adder AD311 of the R signal processing module 310, whose second input terminal is connected to the first adder AD331 of the G signal processing module 330 and whose third input terminal is inversely connected to the first amplifier AP351 of the B signal processing module 350. There also is a third adder AD373 whose first input terminal is inversely connected to the third adder AD313 of the R signal processing module 310, whose second input terminal is connected to the third adder AD333 of the G signal processing module 330 and whose third input terminal is inversely connected to the third adder AD353 of the B signal processing module. In addition, there is a fourth adder AD374 whose first input terminal is inversely connected to the third adder AD313 of the R signal processing module 310, whose second input terminal is connected to the second adder AD332 of the G signal processing module 330 and whose third input terminal is inversely connected to the second adder AD352 of the B signal processing module 350. Finally, the module 370 has a first amplifier AP371 whose input terminal is connected the output terminal of the first adder AD371; a second amplifier AP372 whose input terminal is connected the output terminal of the second adder AD372; a third amplifier AP373 whose input terminal is connected the output terminal of the third adder AD373; and a fourth amplifier AP374 whose input terminal is connected the output terminal of the fourth adder AD374.

Figure 12A:
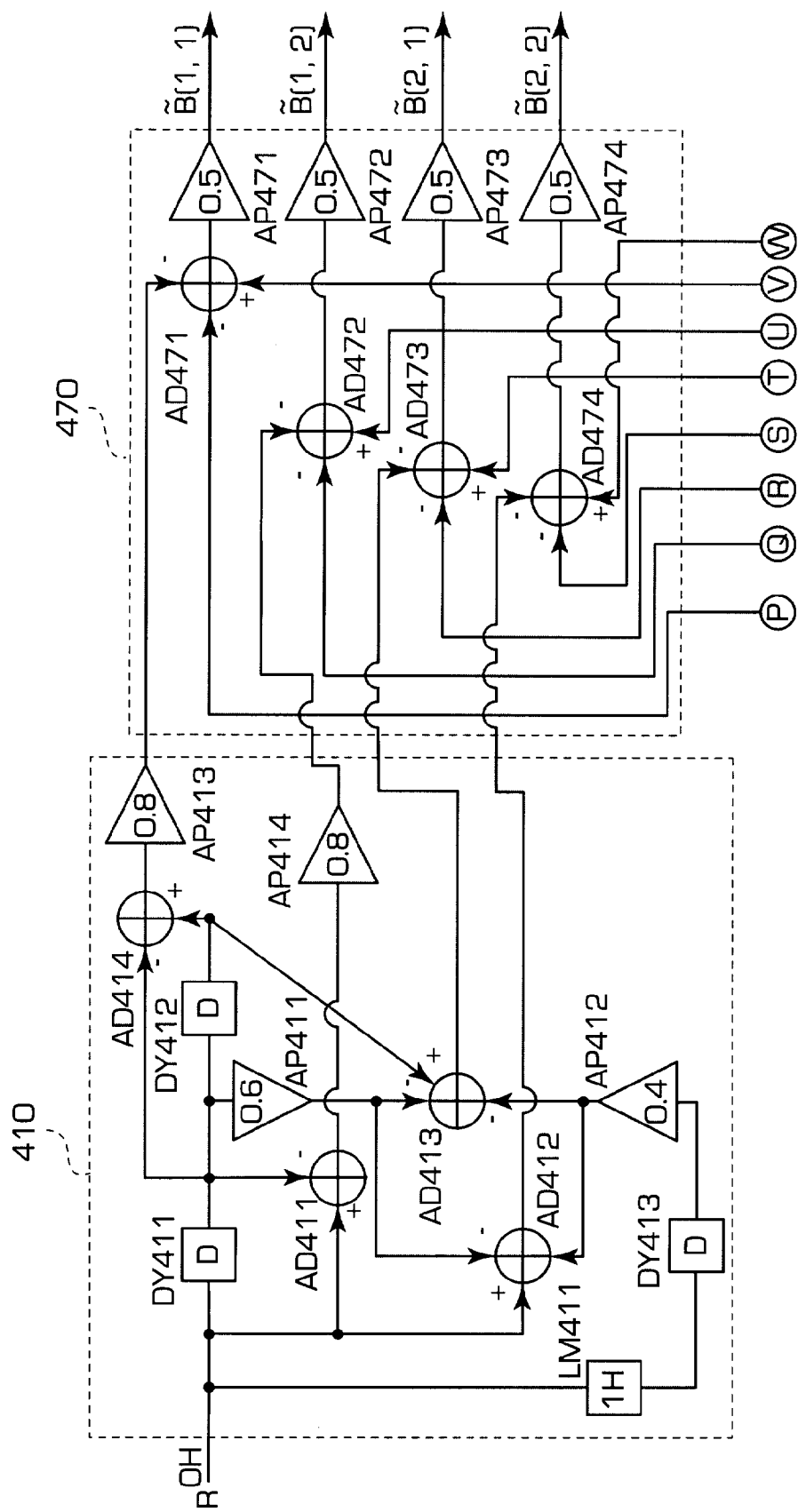
FIGS. 12(A), 12(B) and 12(C) show circuit diagrams of a third decorrelation module in FIG. 9.
Figure 12B:
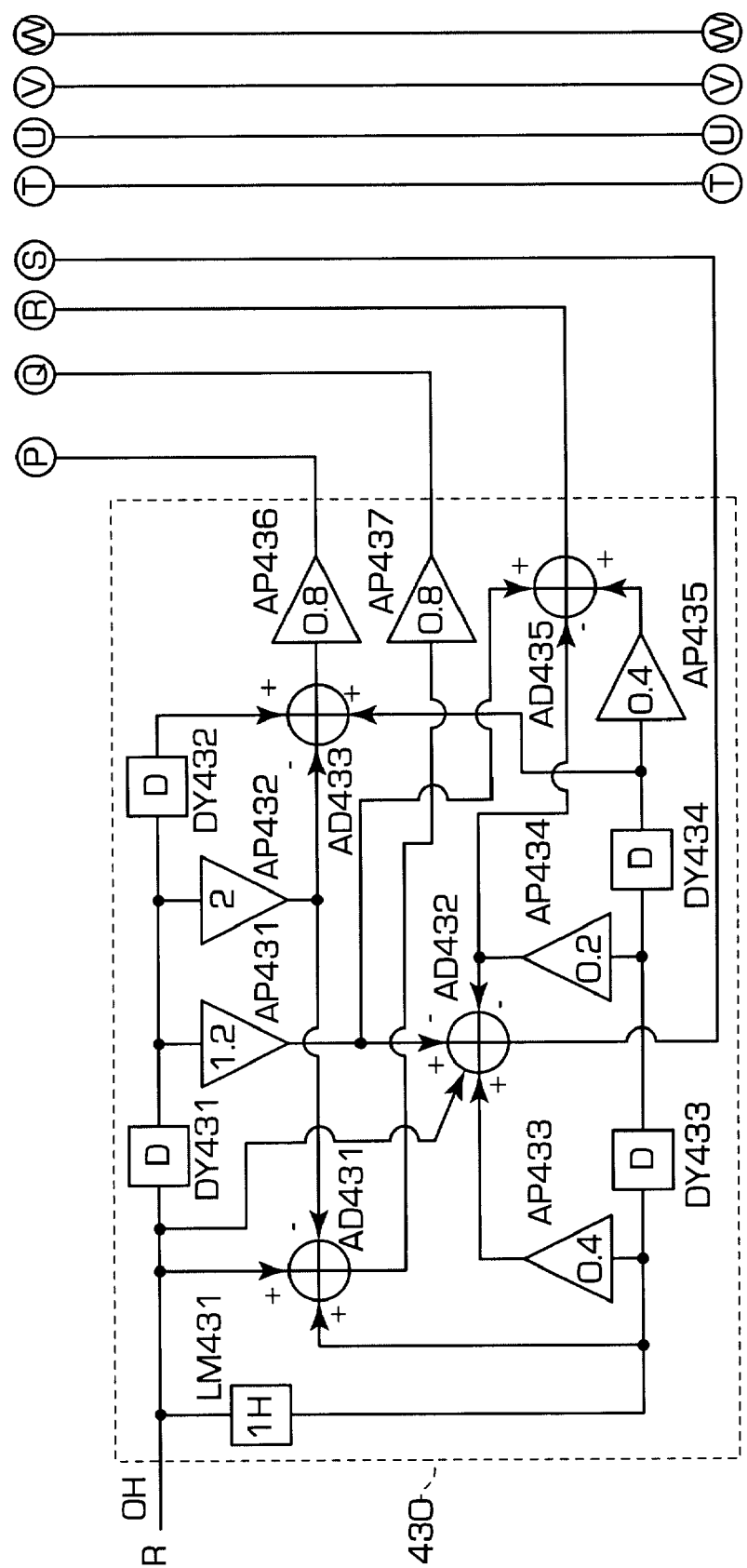
Figure 12C:
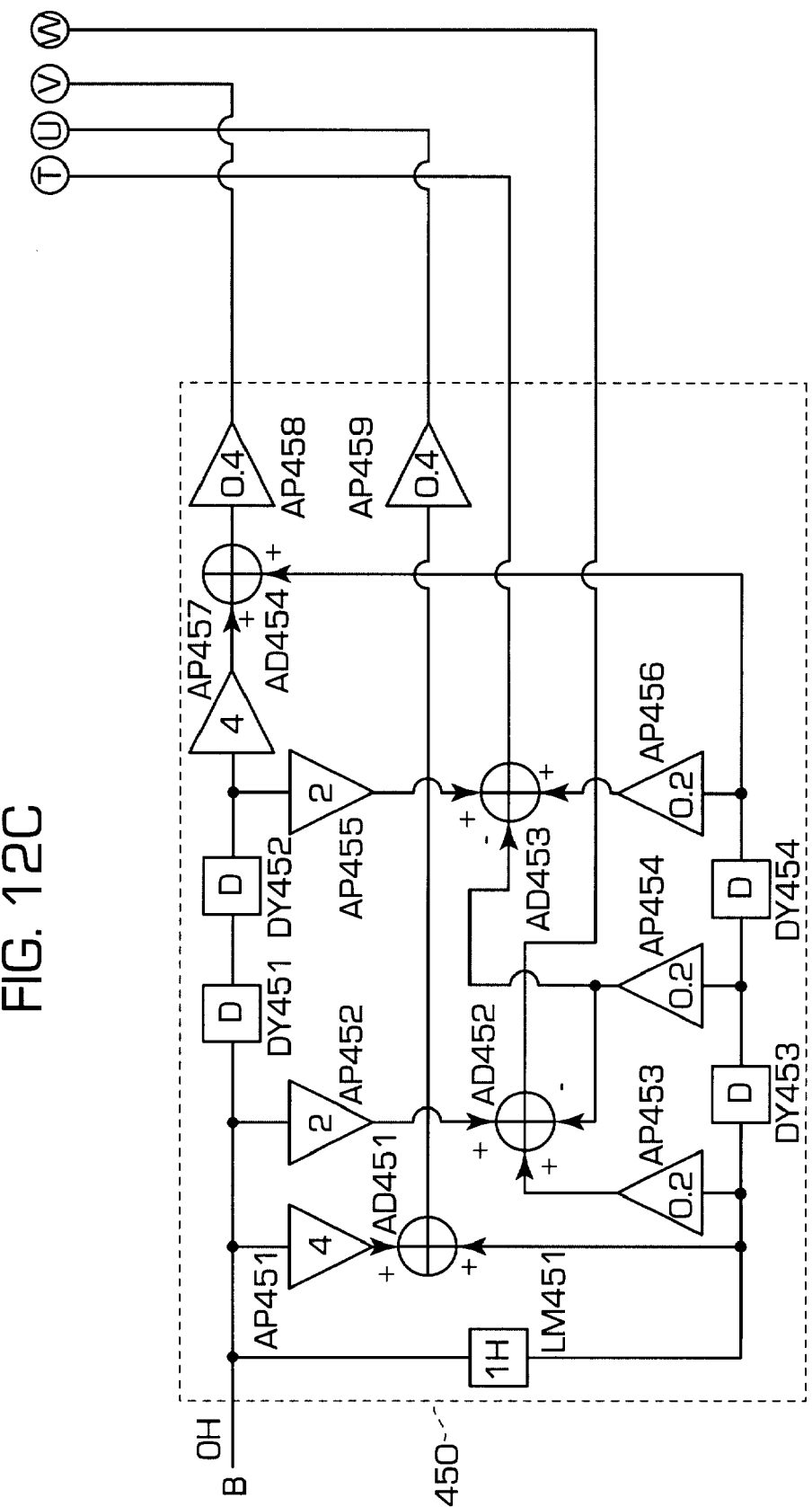

Turning now to FIGS. 12A, 12B and 12C, the third decorrelation module 400 comprises:

a R signal processing module 410 for receiving the degraded R component signal, decorrelating the color components between individual lines and outputting four R component signals;

a G signal processing module 430 for receiving the degraded G component signal, decorrelating the color components between individual lines and outputting four G component signals;

a B signal processing module 450 for receiving the degraded B component signal, decorrelating the color components between individual lines and outputting four B component signals; and a signal combination module 470 for combining the signals from the R signal processing module 410, the G signal processing module 430 and the B signal processing module 450, decorrelating the color components between individual lines and columns, and outputting the RGB component signals.

The R signal processing module 410 in FIG. 12A comprises:

a line memory LM411 and a first delay circuit DY411 for receiving the degraded R component signal;

a first adder AD411 whose first input terminal receives the degraded R component signal and whose second input terminal is inversely connected to the output terminal of the first delay circuit DY411;

a fourth amplifier AP414 whose input terminal is connected to the output terminal of the first adder AD411;

a second delay circuit DY412 whose input terminal is connected to the output terminal of the first delay circuit DY411;

a fourth adder AD414 whose first input terminal is inversely connected to the output terminal of the first delay circuit DY411 and whose second input terminal is connected to the output terminal of the second delay circuit DY412;

a third amplifier AP413 whose input terminal is connected to the output terminal of the fourth adder AD414;

a third delay circuit DY413 whose input terminal is connected to the output terminal of the line memory LM411;

a second amplifier AP412 whose input terminal is connected to the output terminal of the third delay circuit DY413;

a first amplifier AP411 whose input terminal is connected to the output terminal of the first delay circuit DY411;

a second adder AD412 whose first input terminal receives the degraded R component signal, whose second output terminal is inversely connected to the output terminals the first amplifier AP411 and whose third input terminal is inversely connected the output terminal of the second amplifier AP412; and a third adder AD413 whose first input terminal is inversely connected to the output terminal of the first amplifier AP411, whose second input terminal is inversely connected to the output terminal of the second amplifier AP412 and whose third input terminal is connected to the second delay circuit DY412.

The R signal processing module 430 in FIG. 12B comprises:

a line memory LM431, a first delay circuit DY431 and a first amplifier AP431 receiving the degraded R component signal;

a second delay circuit DY432 whose input terminal is connected to the output terminal of the first delay circuit DY431;

a second amplifier AP432 whose input terminal is connected to the output terminal of the first delay circuit DY431;

a third amplifier AP433 whose input terminal is connected to the output terminal of the line memory LM431;

a first adder AD431 whose first input terminal receives the degraded R signal, whose second input terminal is connected to the output terminal of the line memory LM431 and whose third input terminal is inversely connected to the output terminal of the second amplifier AP432;

a seventh amplifier AP437 whose input terminal is connected to the output terminal of the input terminal of the first adder AD431;

a third delay circuit DY433 whose input terminal is connected to the output terminal of the line memory LM431;

a fourth amplifier AP434 whose input terminal is connected to the output terminal of the third delay circuit DY433;

a second adder AD432 whose first input terminal receives the degraded R component signal, whose second input terminal is inversely connected to the output terminal of the first amplifier AP431, whose third input terminal is connected to the output terminal of the third amplifier AP433 and whose fourth input terminal is inversely connected to the output terminal of the fourth amplifier AP434;

a fourth delay circuit DY434 whose input terminal is connected to the output terminal of the third delay circuit DY433;

a third adder AD433 whose first input terminal is connected to the output terminal of the second delay circuit DY432, whose second output terminal is inversely connected to the output terminal the second amplifier AP432 and whose third input terminal is connected to the output terminal of the fourth delay circuit DY434;

a sixth amplifier AP436 whose input terminal is connected to the output terminal of the third adder AD433;

a fifth amplifier AP435 whose input terminal is connected to the output terminal of the fourth delay circuit DY434; and a fifth adder AD435 whose first input terminal is connected to the output terminal of the first amplifier AP431, whose second input terminal is inversely connected to the output terminal of the fourth amplifier AP434 and whose third input terminal is connected to the output terminal of the fifth amplifier AP435.

The B signal processing module 450 in FIG. 12C comprises:

a line memory LM451, a first delay circuit DY451, a first amplifier AP451 and a second amplifier AP452 for receiving the degraded B component signal;

a first adder AD451 whose first input terminal is connected to the output terminal of the first amplifier AP451 and whose second input terminal is connected to the output terminal of the line memory LM451;

a second delay circuit DY452 whose input terminal is connected to the output terminal of the first delay circuit DY451;

a third delay circuit DY453 whose input terminal is connected to the output terminal of the line memory LM451;

a ninth amplifier AP459 whose input terminal is connected to the output terminal of the first adder AD451;

a third amplifier AP453 whose input terminal is connected to the output terminal of the line memory LM451;

a fourth amplifier AP454 whose input terminal is connected to the output terminal of the third delay circuit DY453;

a second adder AD452 whose first input terminal is connected to the output terminal of the second amplifier AP452, whose second input terminal is connected to the output terminal of the third amplifier AP453 and whose third input terminal is inversely connected to the output terminal of the fourth amplifier AP454;

a fifth amplifier AP455 whose input terminal is connected to the output terminal of the second delay circuit DY452;

a fourth delay circuit DY454 whose input terminal is connected to the output terminal of the third delay circuit DY453;

a sixth amplifier AP456 whose input terminal is connected to the output terminal of the fourth delay circuit DY454;

a third adder AD453 whose first input terminal is connected to the output terminal of the fifth amplifier AP455, whose second output terminal is inversely connected to the output terminal the fourth amplifier AP45 and whose third input terminal is connected to the output terminal of the sixth amplifier AP456;

a seventh amplifier AP457 whose input terminal is connected to the output terminal of the second delay circuit DY452;

a fourth adder AD454 whose first input terminal is connected to the output terminal of the seventh amplifier AP457 and whose second input terminal is connected to the output terminal of the fourth delay circuit DY454; and a eighth amplifier AP458 whose input terminal is connected to the output terminal of the fourth adder AD454.

The signal combination module 470 in FIG. 12A comprises:

a first adder AD471 whose first input terminal is inversely connected to the third amplifier AP413 of the R signal processing module 410, whose second input terminal is inversely connected to the sixth amplifier AP416 of the G signal processing module 430 and whose third input terminal is connected to the eighth amplifier AP458 of the B signal processing module 450;

a second adder AD472 whose first input terminal is inversely connected to the fourth amplifier AP414 of the R signal processing module 410, whose second input terminal is inversely connected to the seventh amplifier AP437 of the G signal processing module 430 and whose third input terminal is connected to the ninth amplifier AP459 of the B signal processing module 450;

a third adder AD473 whose first input terminal is inversely connected to the third adder AD413 of the R signal processing module 410, whose second input terminal is inversely connected to the fifth adder AD435 of the G signal processing module 430 and whose third input terminal in connected to the third adder AD453 of the B signal processing module 450;

a fourth adder AD474 whose first input terminal is inversely connected to the second adder AD412 of the R signal processing module 410, whose second input terminal is inversely connected to the second adder AD432 of the G signal processing module 430 and whose third input terminal is connected to the second adder AD452 of the B signal processing module 450;

a first amplifier AP471 whose input terminal is connected the output terminal of the first adder AD471;

a second amplifier AP472 whose input terminal is connected the output terminal of the second adder AD472;

a third amplifier AP473 whose input terminal is connected the output terminal of the third adder AD473; and a fourth amplifier AP474 whose input terminal is connected the output terminal of the fourth adder AD474.

The restoration module 500 of FIG. 9 comprises:

a first restoration module 600 for receiving a R component signal from the first decorrelation module 200, restoring a frequency component in a channel and outputting the R component signal;

a second restoration module 700 for receiving a G component signal from the second decorrelation module 300, restoring a frequency component in a channel and outputting the G component signal; and a third restoration module 800 for receiving a B component signal from the third decorrelation module 400, restoring a frequency component in a channel and outputting the B component signal.

As seen in FIG. 9, the output signals of the first and third restoration module 600 and 800 are provided to the second decorrelation module 300.

Figure 13A:
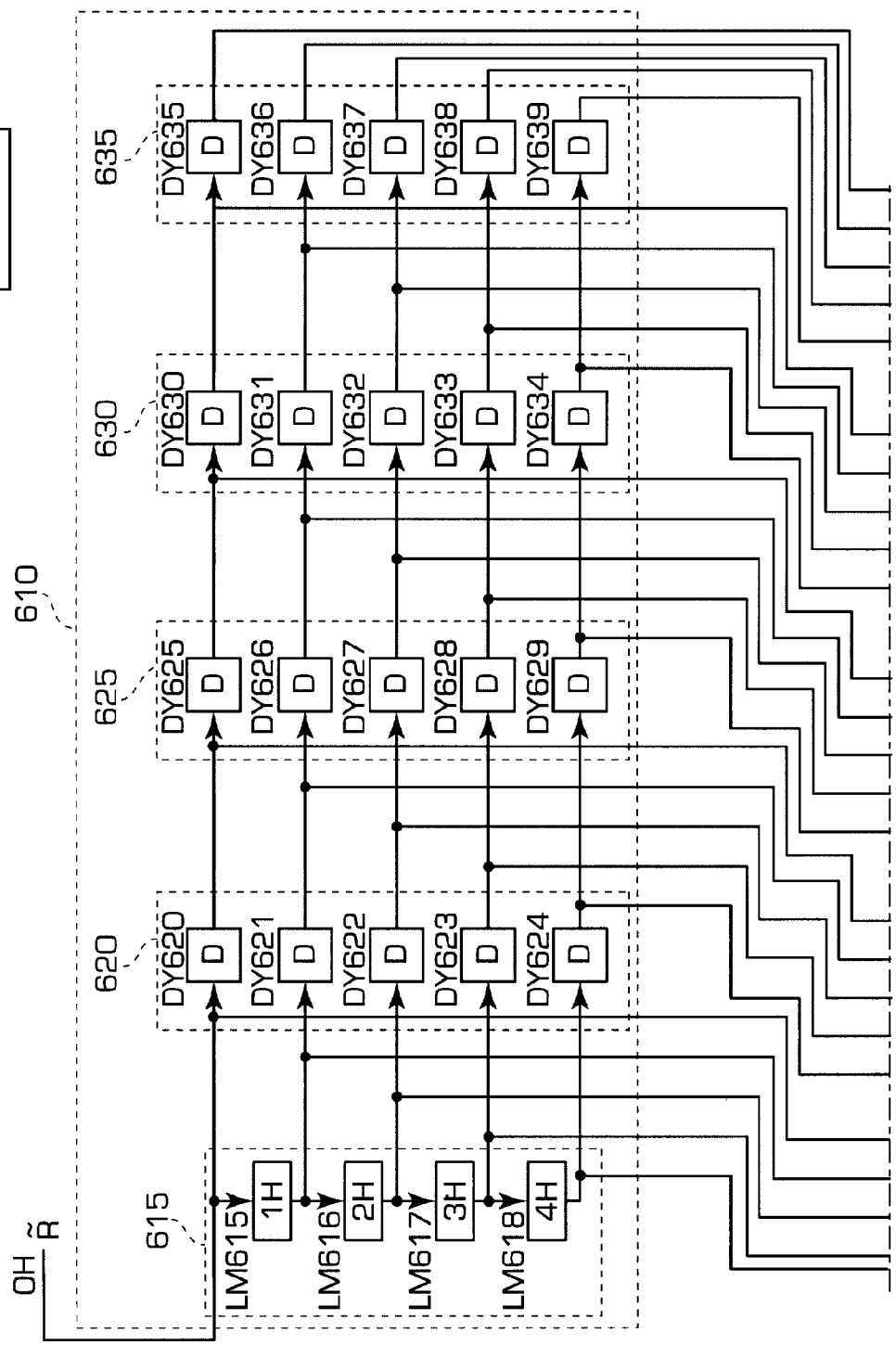

The first restoration module 600 is detailed in FIGS. 13A and 13B and comprises:

a signal delay module 610 for receiving and delaying a signal outputted from the decorrelation module 200, and for outputting twenty five signals of the R components at a time with corresponding delay times;

a coefficient multiplexing module 650 for receiving the twenty five signals from the signal delay module 610 and outputting the signals multiplied by filter coefficients corresponding to the signals, respectively; and a restoring signal output module 690 for receiving and multiplexing the signals from the coefficient multiplexing module 650, and for outputting a single restored signal.

The signal delay module 610 in FIG. 13A comprises:

a first delay module 615 comprising four line memories LM615–LM618 connected in cascade which delay an output signal from the first decorrelation module 615, respectively;

a second delay module 620 comprising five delay circuits DY620–DY624 connected in parallel which delay the output signal from the first decorrelation module 200 and output signals from the line memories LM615–LM618 of the first delay module 615, respectively;

a third delay module 625 comprising five delay circuits DY626–DY629 connected in parallel which delay output signals from the delay circuits DY620–DY624 of the second delay module 620, respectively;

a fourth delay module 630 comprising five delay circuits DY630–DY634 connected in parallel which delay output signals from the delay circuits DY625–DY629 of the third delay module 625, respectively; and a fifth delay module 635 comprising five delay circuits DY635–DY639 connected in parallel which delay output signals from the delay circuits DY630–DY634 of the fourth delay module 630, respectively.

The coefficient multiplexing module 650 in FIG. 13B comprises:

a first coefficient multiplexing module 655 comprising five multipliers MP655–MP659 which multiply the output signals from the first decorrelation module 615 and the line memories LM615–LM618 by corresponding filter coefficients, respectively;

a second coefficient multiplexing module 660 comprising five multipliers MP660–MP664 which multiply the output signals from the second delay module 620 by corresponding filter coefficients, respectively;

a third coefficient multiplexing module 665 comprising five multipliers MP665–MP669 which multiply the output signals from the third delay module 625 by corresponding filter coefficients, respectively;

a fourth coefficient multiplexing module 670 comprising five multipliers MP670–MP674 which multiply the output signals from the fourth delay module 630 by corresponding filter coefficients, respectively; and a fifth coefficient multiplexing module 675 comprising five multipliers MP675–MP679 which multiply the output signals from the fifth delay module 635 by corresponding filter coefficients, respectively.

The restoring signal output module 690 in FIG. 13B comprises:

a first adder AD691 summing the output signals of the first multipliers MP655, MP660, MP665, MP670 and MP675 of the coefficient multiplexing modules 655, 660, 665, 670 and 675, respectively;

a second adder AD692 summing the output signals of the second multipliers MP656, MP661, MP666, MP671 and MP676 of the coefficient multiplexing modules 655, 660, 665, 670 and 675, respectively;

a third adder AD693 summing the output signals of the third multipliers MP657, MP662, MP667, MP672 and MP677 of the coefficient multiplexing modules 655, 660, 665, 670 and 675, respectively;

a fourth adder AD694 summing the output signals of the fourth multipliers MP658, MP663, MP668, MP673 and MP678 of the coefficient multiplexing modules 655, 660, 665, 670 and 675, respectively; and a fifth adder AD695 summing the output signals of the fifth multipliers MP659, MP664, MP669, MP674 and MP679 of the coefficient multiplexing modules 655, 660, 665, 670 and 675, respectively.

Since the construction of the second restoration module and the third restoration module is identical to that of the first restoration module, the detailed description is omitted.

The overall operation is as follows, with reference to FIGS. 9–13.

When degraded RGB component signals are inputted by a single CCD, a decorrelation module 100 outputs the RGB component signals decorrelated with each channel. A restoration module 500 receives the RGB component signals from the decorrelation module 100, restores frequency components lost in the channels and outputs the RGB component signals, thereby improving the image quality of the degraded RGB component signals.

In particular, the first decorrelation module as shown in FIGS. 10A and 10B uses Eq. (78) to (81) in order to decorrelate a decorrelation factor in the $\overline{R}$" component of the odd fields calculated in Eq. (66) to (69).

$$R(1, 1) = [2R(1, 2) + 0.2R(2, 2) - 0.2R(2, 1)] - \qquad (78)$$
$$[G(1, 2) + 1.2G(1, 1) - 0.2G(2, 1) + 0.4G(2, 2)] -$$
$$[B(1, 2) - 0.6B(1, 1) - 0.4B(2, 1)]$$

$$\tilde{R}(1, 2) = [2\overline{R}(1, 2) + 0.2\overline{R}(2, 2) - 0.2\overline{R}(2, 3)] - \qquad (79)$$
$$[\overline{G}(1, 2) - 1.2\overline{G}(1, 3) - 0.2\overline{G}(2, 3) + 0.4\overline{G}(2, 2)] -$$
$$[\overline{B}(1, 2) - 0.6\overline{B}(1, 3) - 0.4\overline{B}(2, 3)]$$

$$\tilde{R}(2, 1) = [1.6\overline{R}(1, 2) + 0.4\overline{R}(2, 2)] - [0.8\overline{G}(1, 2) - \qquad (80)$$
$$1.6\overline{G}(1, 1) + 0.8\overline{G}(2, 2)] - [0.8\overline{B}(1, 2) - 0.8\overline{B}(1, 1)]$$

$$\tilde{R}(2, 2) = [1.6\overline{R}(1, 2) + 0.4\overline{R}(2, 2)] - [0.8\overline{G}(1, 2) - \qquad (81)$$
$$1.2\overline{G}(1, 1) + 0.2\overline{G}(2, 2)] - [0.8\overline{B}(1, 2) - 0.8\overline{B}(1, 3)]$$

As shown in FIGS. 10A–10B, the first decorrelation module 200 eliminates a G component signal and a B component signal from the inputted RGB component signal. When the R component signal is received, the R signal processing module 210 processes the R component signal by adding and/or subtracting the signal passed through the first delay circuit DY211 and the second amplifier AP212, the signal passed through the line memory LM211, the second delay circuit DY212 and the third amplifier AP213, and the signal passed through the first delay circuit DY211, the third delay circuit DY213 and the fourth amplifier AP214 so that the resultant R component signal is in accord with Eq. (78).

Also, when G component signal is received, the G signal processing module 230 in FIG. 10A processes the G component signal by adding and/or subtracting the signal passed through the first delay circuit DY231 and the second amplifier AP232, the signal passed through the first delay circuit DY231, the third delay circuit DY233 and the fifth amplifier AP235, the signal passed through the line memory LM231, the second delay circuit DY232, the fourth delay circuit DY234 and the seventh amplifier AP237 so that the resultant G component signal is in accord with Eq. (78).

Similarly, when B component signal is received, the B signal processing module 250 in FIG. 10B processes the B component signal by adding and/or subtracting the signal passed through the first delay circuit DY251 and the third delay circuit DY253 and the third amplifier AP253, and the signal passed through the line memory LM251, the second delay circuit DY252, the fourth delay circuit DY254 and the fourth amplifier AP254.

The first adder AD271 and the second adder AD272 of the signal combination module subtracts the signal of G signal processing module 230 and the B signal processing module 250 from the signal of R signal processing module 210 calculated above. The first amplifier AP271 of the signal combination module satisfies Eq. (78) multiplying the value of the signal by 0.5. Thus, the R component signal of the odd column of the odd line is processed.

Similarly, the delay circuits, line memories, and adders processes the RGB component signals in order to satisfy Eq. (79), Eq. (80) and Eq. (81). Therefore, the R component signal of the even column of the odd line, the R component signal of the odd column of the even line and the R component signal of the even column of the even line are processed.

Accordingly, the first decorrelation module 200 decorrelates the decorrelating factor with the degraded R component signal, by satisfying Eq. (78) to Eq. (81), and realizes the original color components by outputting the pure R component signal.

Now referring to FIGS. 11A and 11B, the second decorrelation module 300 satisfies Eq. (82) to Eq. (85) in order to eliminate the decorrelating factor from the "G" component of odd fields calculated in Eq. (70) to Eq. (73)

$$\tilde{G}(1, 1) = [4\overline{G}(1, 1) + 2\overline{G}(2, 2) - \overline{G}(2, 1)] - \quad (82)$$
$$[\overline{R}(2, 2) - \overline{R}(2, 1)] - [2\overline{B}(1, 1) - 2\overline{B}(2, 1)]$$

$$\tilde{G}(1, 2) = [4\overline{G}(1, 3) + 2\overline{G}(2, 2) - \overline{G}(2, 3)] - \quad (83)$$
$$[\overline{R}(2, 2) - \overline{R}(2, 3)] - [2\overline{B}(1, 3) - 2\overline{B}(2, 3)]$$

$$\tilde{G}(2, 1) = [2\overline{G}(1, 1) + 4\overline{G}(2, 2) - \overline{G}(1, 2)] - \quad (84)$$
$$[2\overline{R}(2, 2) - 2\overline{R}(1, 2)] - [B(1, 1) - B(1, 2)]$$

$$G(2, 2) = [2G(1, 3) + 4G(2, 2) - G(1, 2)] - \quad (85)$$
$$[2R(2, 2) - 2R(1, 2)] - [B(1, 3) - B(1, 2)]$$

As shown in FIGS. 9, 11A and 11B, the second decorrelation module 300 eliminates the R component signal and the B component signal from the inputted RGB component signal. When R component signal is received, the R signal processing module 310 processes the R component signal by adding and/or subtracting the signal passed through the first delay circuit DY311 and the signal passed through the first delay circuit DY311 and the second delay circuit DY312 so that the resultant R component signal is in accord with Eq. (82).

Also, when the G component signal is received, the G signal processing module 330 processes the G component signal by adding and/or subtracting the signal passed through the first delay circuit DY331 and the second amplifier AP332, and the signal passed through the line memory LM331, the third delay circuit DY333, the fourth delay circuit DY334 and the sixth amplifier AP336 so that the resultant G component signal is in accord with Eq. (82).

Similarly, when B component signal is received, the B signal processing module 350 processes the B component signal by adding and/or subtracting the signal passed through the first delay circuit DY351 and the second delay circuit DY352, and the signal passed through the line memory LM351, the third delay circuit DY353, the fourth delay circuit DY354, and the second amplifier AP352 multiplies the signal by 2 so that the resultant B component signal is in accord with Eq. (82).

As seen in FIG. 11A, the first adder AD371 of the signal combination module 370 subtracts the signal of R signal processing module 310 and the B signal processing module 350 from the signal of G signal processing module 210 calculated above. The first amplifier AP371 of the signal combination module 370 satisfies Eq. (82) by multiplying the value of the signal by 0.2, thus the G component signal of the odd column of the odd line is processed.

Similarly, the delay circuits, line memories, and adders processes the RGB component signals in order to satisfy Eq. (83), Eq. (84) and Eq. (85), therefore, the G component signal of the even column of the odd line, the G component signal of the odd column of the even line and the G component signal of the even column of the even line are processed.

Therefore, the second decorrelation module 300 decorrelates the decorrelating factor with the degraded G component signal satisfied Eq. (82) to Eq. (85), and realizes the original color components by outputting the pure G component signal.

Referring now to FIGS. 12A and 12B, the third decorrelation module 400 satisfies Eq. (86) to Eq. (89) in order to eliminate the decorrelating factor from the B" component of the odd fields calculated in Eq. (74) to Eq. (77).

$$\tilde{B}(1, 1) = 0.4[\overline{B}(1, 1) + 4\overline{B}(2, 1)] - 0.8[\overline{R}(2, 1) - \overline{R}(2, 2)] - \quad (86)$$
$$0.8[\overline{G}(1, 1) + \overline{G}(2, 1) - 2\overline{G}(2, 2)]$$

$$\tilde{B}(1, 2) = 0.4[\overline{B}(1, 3) + 4\overline{B}(2, 3)] - 0.8[\overline{R}(2, 3) - \overline{R}(2, 2)] - \quad (87)$$
$$0.8[\overline{G}(1, 3) + \overline{G}(2, 3) - 2\overline{G}(2, 2)]$$

$$\tilde{B}(2, 1) = [0.2\overline{B}(1, 1) - 0.2\overline{B}(1, 2) + 2\overline{B}(2, 1)] - \quad (88)$$
$$[\overline{R}(2, 1) - 0.4\overline{R}(1, 2) + 0.6\overline{R}(2, 2)] -$$
$$[0.4\overline{G}(1, 1) - 0.2\overline{G}(1, 2) + \overline{G}(2, 1) - 1.2G(2, 2)]$$

$$\tilde{B}(2, 21) = [0.2\overline{B}(1, 3) - 0.2\overline{B}(1, 2) + 2\overline{B}(2, 3)] - \quad (89)$$
$$[\overline{R}(2, 3) - 0.4\overline{R}(1, 2) + 0.6\overline{R}(2, 2)] -$$
$$[0.4\overline{G}(1, 3) - 0.2\overline{G}(1, 2) + \overline{G}(2, 3) - 1.2G(2, 2)]$$

As shown in FIGS. 12A and 12B, the third decorrelation module 400 eliminates the R component signal and the G component signal from the inputted RGB component signal. When R component signal is received, the R signal processing module processes the R component signal by adding and/or subtracting the signal passed through the first delay circuit DY411 and the signal passed through the first delay circuit DY411 and the second delay circuit DY412, and by multiplying the signal by 0.8 in the third amplifier AP413 so that the resultant R component signal is in accord with Eq. (86).

Also, as seen in FIG. 12B, when G component signal is received, the G signal processing module 430 processes the G component signal by adding and/or subtracting the signal passed through the first delay circuit DY431 and the second amplifier AP432, and the signal passed through the line memory LM431, the third delay circuit DY433 and the fourth delay circuit DY434, and by multiplying the signal by 0.8 in the sixth amplifier AP436 so that the resultant G component signal is in accord with Eq. (86).

Similarly, when B component signal is received, the B signal processing module 450 processes the B component signal by adding and/or subtracting the signal passed through the first delay circuit DY451, the second delay circuit DY452 and the seventh amplifier AP457, and the signal passed through the line memory LM451, the third delay circuit DY453, the fourth delay circuit DY454, and by multiplying by 0.4 in the eighth amplifier AP458 so that the resultant B component signal is in accord with Eq. (86).

The first adder AD471 of the signal combination module 470 subtracts the signal of R signal processing module 410 and the G signal processing module 430 from the signal of B signal processing module 450 calculated above. The first amplifier AP471 of the signal combination module satisfies Eq. (86) multiplying the value of the signal by 0.5, thus the B component signal of the odd column of the odd line is processed.

Similarly, the delay circuits, line memories, and adders processes the RGB component signals in order to satisfy Eq. (87), Eq. (88) and Eq. (89), therefore, the B component signal of the even column of the odd line, the B component signal of the odd column of the even line and the B component signal of the even column of the even line are processed.

Therefore, the third decorrelation module 400 decorrelates the decorrelating factor with the degraded B component signal satisfied in Eq. (86) to Eq. (89), and realizes the original color components by outputting the pure B component signal.

The restoration module 500 in FIG. 9 receives the individual R, G and B component signals from the decorrelation module 100, and outputs the signals with the restored frequency components lost in the corresponding channels, thereby improving the image quality of the degraded RGB component signals.

Referring now to FIGS. 13A and 13B, the first decorrelation module decorrelates the signal in each channel, and the signal delay module receives the signal. The first delay circuit DY620 of the second delay module 620 outputs the signal delayed once, and the first delay circuit DY625 of the third delay module 625 delays the signal from the first delay circuit DY620 of the second delay module and outputs the delayed signal. The delayed signal from the first delay circuit DY625 of the third delay module 625 is delayed again by the first delay circuit DY630 of the fourth delay module 630. The delayed signal from the first delay circuit DY630 of the fourth delay module 630 is delayed again by the first delay circuit DY635 of the fifth delay module 635, therefore, five different delayed signals are outputted.

The first line memory LM615 of the first delay module 615 delays all the five delayed signals and the second delay circuit DY621 for the second delay module 620 delays the signals.

The delaying procedure is repeated in the above description, and the delayed signals of five lines and five columns is outputted simultaneously.

The coefficient multiplexer 650 in FIG. 13B receives the twenty five coefficient signals from the signal delay module 610 and outputs the signals multiplied by corresponding filter coefficients, respectively. The coefficients as shown in FIG. 15 are composed of a 5×5 matrix and have the corresponding magnitudes to individual lines and columns.

As shown in FIG. 14, the coefficients are composed of the odd column of the odd line, the even column of the odd line, the odd column of the even line and the even column of the even line, sequentially. The table 1 below shows the magnitude of each coefficient.

The first adder AD691 to the fifth adder AD695 of the restoring signal output module 690 receives the signals from the coefficient multiplexer 650 and each adder outputs a single multiplexed signal. Thus, the sixth adder AD696 add the signals from the first adder AD691 to the fifth adder AD695 and outputs a single signal.

Therefore, the first restoration module 600 outputs the more distinct R component signal outputted from the first decorrelation module.

In similar way, the second restoration module 700 and the third restoration module 800 process the G component signal and the B component signal using the coefficients in table 2 and table 3, respectively. Thus, the second restoration module 700 and the third restoration module 800 output the more distinct G component signal and the more distinct B component signal, respectively.

The multiplexer 900 alternatively outputs the R component signal from the first restoration module 600 and the B component signal from the third restoration module 800, dependent on a time period.

Accordingly, the present invention is provided with the digital video camera using a signal CCD, so that the present invention identifies the degraded factors in converting an electrical signal into a luminance signal and a color signal, compensates the signal for errors from degradation and restores the signal to the original state.

While it has been shown and described what is at present considering the preferred embodiments of the invention, it will be obvious to those skilled in the art that various changes and modifications can be readily made therein without departing from the scope and spirit of the invention as defined by the appended claims.

TABLE 1

| | | | | |
|---|---|---|---|---|
| −0.0072629 | −0.0026667 | −0.0011651 | −0.0008666 | −0.0001549 |
| 0.0011545 | 0.1149361 | −0.0189408 | −0.0026368 | −0.0001070 |
| 0.1060624 | 0.6524965 | 0.0963145 | 0.0023476 | −0.0016690 |
| 0.0356727 | 0.0591697 | −0.0087038 | −0.0063856 | −0.0011126 |
| 0.0011678 | −0.0097117 | −0.0068773 | −0.0011930 | 0.0001498 |
| −0.0008606 | −0.0011571 | −0.0026481 | −0.0072327 | −0.0018273 |
| −0.0026186 | −0.0188103 | 0.1141459 | 0.0011465 | −0.0064832 |
| 0.0023315 | 0.0956506 | 0.6479992 | 0.1053314 | 0.0028432 |
| −0.0063416 | −0.0086438 | 0.0587619 | −0.0354268 | 0.0075595 |
| −0.0011847 | −0.0068199 | −0.0096448 | 0.0011957 | 0.0019266 |
| −0.0012672 | −0.0043763 | −0.0012672 | 0.0004574 | 0.0003052 |
| −0.0123242 | −0.0034765 | −0.0123242 | −0.0031446 | −0.0000357 |
| 0.0107002 | 0.1350355 | 0.0170002 | −0.0071010 | −0.0018022 |
| 0.1127201 | 0.6454531 | 0.1127201 | 0.0055216 | −0.0011295 |
| −0.0205609 | 0.0215532 | −0.0205609 | −0.0092675 | −0.0015288 |
| 0.0004618 | −0.0012792 | −0.0044176 | −0.0012792 | 0.0004618 |
| −0.0031742 | −0.0124404 | −0.0085564 | −0.0124404 | −0.0031742 |
| −0.0071679 | 0.0108011 | 0.1867806 | 0.0108011 | −0.0071679 |
| 0.0055737 | 0.1137832 | 0.6515403 | 0.1137832 | 0.0055737 |
| 0.0093549 | −0.0207548 | 0.0217564 | −0.0207548 | −0.0093549 |

TABLE 2

| | | | | |
|---|---|---|---|---|
| −0.0581146 | 0.0296536 | −0.0077371 | −0.0019898 | −0.0006770 |
| −0.0244963 | 0.1798881 | 0.0416528 | 0.0130856 | −0.0016228 |
| 0.0013758 | 0.1792039 | 0.6481741 | 0.1044287 | −0.0057255 |
| 0.0016116 | 0.0538275 | 0.1308554 | −0.1545624 | −0.0671804 |
| 0.0007410 | 0.0095024 | 0.0011009 | −0.0874589 | 0.0144636 |
| −0.0019324 | −0.0075140 | 0.0287983 | −0.0564385 | −0.0069283 |
| 0.0127082 | 0.0404515 | 0.1746999 | −0.0237898 | −0.0121917 |
| 0.1014169 | 0.6294799 | 0.1746999 | 0.0013361 | −0.0072177 |
| −0.1501046 | 0.1270813 | 0.0522751 | 0.0015651 | −0.0029755 |
| −0.0849365 | 0.0010692 | 0.0092284 | 0.0007196 | −0.0008357 |
| −0.0849365 | 0.0010692 | 0.0092284 | 0.0007196 | −0.0008357 |
| −0.1501046 | 0.1270813 | 0.0588751 | 0.0015651 | −0.0029755 |
| 0.1014169 | 0.6294798 | 0.1740354 | 0.0013361 | −0.0072177 |
| 0.0127082 | 0.0404514 | 0.1746999 | −0.0237898 | −0.0121917 |
| −0.0019324 | −0.0075140 | 0.0287983 | −0.0564385 | −0.0069283 |
| 0.0007410 | 0.0095024 | 0.0011009 | −0.0374589 | 0.0144636 |
| 0.0014114 | 0.0538275 | 0.1308554 | −0.1545624 | −0.0671804 |
| 0.0013758 | 0.1792039 | 0.6481740 | 0.1044287 | −0.0057255 |
| −0.0244963 | 0.1798881 | 0.0416528 | 0.0130856 | −0.0016228 |
| −0.0581146 | 0.0296536 | −0.0077371 | −0.0019898 | −0.0006770 |

TABLE 3

| | | | | |
|---|---|---|---|---|
| −0.0093549 | −0.0207548 | 0.0217564 | −0.0207548 | −0.0093549 |
| 0.0055737 | 0.1137832 | 0.6515405 | 0.1137832 | 0.0055737 |
| −0.0071697 | 0.0108011 | 0.1867806 | 0.0108011 | −0.0071679 |
| −0.0031742 | −0.0124405 | −0.0085564 | −0.0124405 | −0.0031742 |
| 0.0004618 | −0.0012792 | −0.0044176 | −0.0012792 | 0.0004618 |
| −0.0205609 | 0.0215532 | −0.0205609 | −0.0092675 | −0.0015288 |
| 0.1127202 | 0.1127202 | 0.1127202 | 0.0055216 | −0.0011295 |
| 0.0107002 | 0.1850356 | 0.0107002 | −0.0071010 | −0.0018022 |
| −0.0123242 | −0.0084765 | −0.0123242 | −0.0031446 | −0.0000357 |
| −0.0012672 | −0.0043763 | −0.0012672 | 0.0004574 | 0.0003020 |
| −0.0011847 | −0.0068299 | −0.0096448 | 0.0011597 | 0.0019266 |
| −0.0063416 | −0.0086438 | 0.0587619 | 0.0354268 | 0.0075595 |
| 0.0023315 | 0.0956506 | 0.6479992 | 0.1053314 | 0.0028432 |
| −0.0026186 | −0.0188103 | 0.1141459 | 0.0011465 | −0.0064862 |
| −0.0008606 | −0.0011571 | −0.0026484 | −0.0072327 | −0.0018273 |
| 0.0011676 | −0.0097117 | −0.0068773 | −0.0011930 | 0.0001498 |
| 0.0356727 | 0.0591697 | −0.0087038 | −0.0063856 | −0.0011126 |
| 0.1060624 | 0.6524966 | 0.0963145 | 0.0023476 | −0.0016690 |
| 0.0011545 | 0.1149381 | −0.0189408 | −0.0026368 | −0.0001070 |
| −0.0072829 | −0.0026667 | −0.0011651 | −0.0008666 | −0.0001549 |

What is claimed is:

1. An image restoration system for a single charge coupled device color video camera comprising:
    a decorrelation module for receiving degraded RGB component signals image-processed by the single charge coupled device and outputting individual RGB component signals having decorrelated color components between individual channels; and
    a frequency restoration module for receiving the RGB component signals from said decorrelation module, restoring frequency components lost in channels and outputting the RGB component signals;
    wherein said decorrelation module comprises:
        a first decorrelation module for receiving the degraded RGB component signals, eliminating a correlation signal in the R component signal using the G and B component signals, and outputting a pure R component signal;
        a second decorrelation module for receiving the degraded G component signal and the R and B component signals which are decorrelated and frequency-restored, eliminating a correlation signal in the G component signal using the decorrelated and frequency restored R and B component signals, and outputting a pure G component signal; and
        third decorrelation module for receiving the degraded RGB component signals, eliminating a correlation signal in the component signal using the G and R component signals, and outputting a pure B component signal.

2. An image restoration system as defined in claim 1, wherein said first decorrelation module comprises:
    an R signal processing circuit for receiving the degraded R component signal, decorrelating the color components between individual lines and outputting a first plurality R component signals;
    a G signal processing circuit for receiving the degraded G component signal, decorrelating the color components between individual lines and outputting a second plurality of G component signals;
    a B signal processing circuit for receiving the degraded B component signal, decorrelating the color components between individual lines and outputting a third plurality of B component signals; and
    signal combination circuit for combining the signals from said R signal processing circuit, said G signal processing circuit and said B signal processing circuit, decorrelating the color components between individual lines and columns, and outputting the RGB component signals.

3. An image restoration system as defined in claim 2, wherein said R signal processing circuit comprises:
    a line memory, a first delay circuit and a first amplifier for receiving the degraded R component signal;
    a second amplifier whose input terminal is connected to the output terminal of the first delay circuit;
    a second delay circuit whose input terminal is connected to the output terminal of the line memory;
    a third amplifier whose input terminal is connected to the output terminal of the second delay circuit;
    a first adder whose first input terminal is connected to the output terminal of the second amplifier and whose second input terminal is connected to the output terminal of the third amplifier;
    a second adder whose first input terminal is connected to the output terminal of the first adder and whose second input terminal is inversely connected to the output terminal of the first amplifier;
    a third delay circuit whose input terminal is connected to the output terminal of the first delay circuit;
    a fourth amplifier whose input terminal is connected to the output terminal of the third delay circuit;
    a third adder whose first input terminal is inversely connected to the output terminal of the fourth amplifier and whose second output terminal is connected to the input terminal of the first adder;
    a fifth amplifier whose input terminal is connected to the output terminal of the second delay circuit;
    a sixth amplifier whose input terminal is connected to the output terminal of the first delay circuit; and
    a fourth adder whose first input terminal is connected to the output terminal of the fifth amplifier and whose second input terminal is connected to the output terminal of the sixth amplifier.

4. An image restoration system as defined in claim 2, wherein said G signal processing circuit comprises:
    a line memory, a first delay circuit and a first amplifier for receiving the degraded G component signal;
    a second delay circuit whose input terminal is connected to the output terminal of the line memory;
    a second amplifier whose input terminal is connected to the output terminal of the first delay circuit;
    a third amplifier whose input terminal is connected to the output terminal of the first delay circuit;
    a first adder whose first input terminal is connected to the output terminal of the second delay circuit and whose second input terminal is connected to the output terminal of the second amplifier;
    a third delay circuit whose input terminal is connected to the output terminal of the first delay circuit;
    a fifth amplifier whose input terminal is connected to the output terminal of the third delay circuit;
    a fourth amplifier whose input terminal is connected to the output terminal of the second delay circuit;
    a second adder whose first input terminal is connected to the output terminal of the third amplifier, whose second input terminal is connected to the output terminal of the first adder and whose third input terminal is connected to the output terminal of the fourth amplifier;

a fourth delay circuit whose input terminal is connected to the output terminal of the second delay circuit;

a sixth amplifier whose input terminal is connected to the output terminal of the fourth delay circuit;

a third adder whose first input terminal is connected to the output terminal of the second adder and whose second input terminal is inversely connected to the output terminals of the sixth amplifier;

a seventh amplifier whose input terminal is connected to the output terminal of the fourth delay circuit;

a fourth adder whose first input terminal is inversely connected to the output terminal of the fifth amplifier, whose second input terminal is connected to the output terminal of the first adder and whose third input terminal is inversely connected to the output terminal of the seventh amplifier;

a eighth amplifier whose input terminal is connected to the output terminal of the line memory;

a fifth adder whose first input terminal is inversely connected to the output terminal of the eighth amplifier, whose second input terminal is inversely connected to the output terminal of the first amplifier and whose third input terminal is connected to the output terminal of the second delay circuit;

a ninth amplifier whose input terminal is connected to the output terminal of the line memory; and a sixth adder whose first input terminal is inversely connected to the output terminal of the ninth amplifier and whose second input terminal is connected to the output terminal of the first adder.

5. An image restoration system as defined in claim 2, wherein said B signal processing circuit comprises:

a line memory, a first delay circuit and a first amplifier for receiving the degraded B component signal;

a second amplifier whose input terminal is connected to the output terminal of the line memory;

a second delay circuit whose input terminal is connected to the output terminal of the line memory;

a third delay circuit whose input terminal is connected to the output terminal of the first delay circuit;

a third amplifier whose input terminal is connected to the output terminal of the third delay circuit;

a first adder whose first input terminal is connected to the output terminal of the first amplifier and whose second input terminal is connected to the output terminal of the second amplifier;

a second adder whose first input terminal is connected to the output terminal of the second delay circuit and whose second input terminal is inversely connected to the output terminal of the first adder;

a fourth delay circuit whose input terminal is connected to the output terminal of the second delay circuit;

a fourth amplifier whose input terminal is connected to the output terminal of the fourth delay circuit;

a third adder whose first input terminal is inversely connected to the output terminal of the third amplifier, whose second input terminal is connected to the output terminal of the second delay circuit and whose third input terminal is inversely connected to the output terminal of the fourth amplifier;

a fifth amplifier whose input terminal is connected to the output terminal of the line memory;

a sixth amplifier whose input terminal is connected to the output terminal of the second delay circuit;

a fourth adder whose first input terminal is inversely connected to the output terminal of the fifth amplifier and whose second input terminal is connected to the output terminal of the sixth amplifier;

a seventh amplifier whose input terminal is connected to the output terminal of the fourth delay circuit; and a fifth adder whose first input terminal is inversely connected to the output terminal of the seventh amplifier and whose second input terminal is connected to the output terminal of the sixth amplifier.

6. An image restoration system as defined in claim 2, wherein said signal combination circuit comprises:

a first adder whose first input terminal receives a first G component signal from said G signal processing circuit and whose second input terminal receives a first B component signal from said B signal processing circuit;

a second adder whose first input terminal receives a first R component signal from R signal processing circuit and whose second input terminal is inversely connected to the output terminal of the first adder;

a third adder whose first input terminal receives a second R component signal from said R signal processing circuit, whose second input terminal inversely receives a second G component signal from said G signal processing circuit and whose third input terminal inversely receives a second B component signal from said B signal processing circuit;

a fourth adder whose first input terminal receives a third R component signal from said R signal processing circuit, whose second input terminal inversely receives a third G component signal from said G signal processing circuit and whose third input terminal inversely receives a third B component signal from said B signal processing circuit;

a fifth adder whose first input terminal receives the third R component signal from said R signal processing circuit, whose second input terminal inversely receives a fourth G component signal from said G signal processing circuit and whose third input terminal inversely receives a fourth B component signal from said B signal processing circuit;

a first amplifier whose input terminal is connected the output terminal of the second adder;

a second amplifier whose input terminal is connected the output terminal of the third adder;

a third amplifier whose input terminal is connected the output terminal of the fourth adder; and a fourth amplifier whose input terminal is connected the output terminal of the fifth adder.

7. An image restoration system as defined in claim 3, wherein said second decorrelation module comprises:

an R signal processing circuit for receiving the degraded R component signal, decorrelating the color components between individual lines and outputting a first plurality of R component signal;

a G signal processing circuit for receiving the degraded G component signal, decorrelating the color components between individual lines and outputting a second plurality of G component signals;

a B signal processing circuit for receiving the degraded B component signal, decorrelating the color components between individual lines and outputting a third plurality of B component signals; and signal combination circuit for combining the signals from said R signal processing circuit, said G signal processing circuit and said B signal processing circuit, decorrelating the color components between individual lines and columns, and outputting the RGB component signals.

8. An image restoration system as defined in claim 7, wherein said R signal processing circuit comprises:

a line memory and a first delay circuit for receiving a R component signal which is decorrelated and restored with a frequency;

a first adder whose first input terminal inversely receives the R component signal which is decorrelated and restored with a frequency, and whose second input terminal is connected to the output terminal of the first delay circuit;

a second delay circuit whose input terminal is connected to the output terminal of the first delay circuit;

a second adder whose first input terminal is connected to the output terminal of the first delay circuit and whose second input terminal is inversely connected to the output terminal of the second delay circuit;

a first amplifier whose input terminal is connected to the output terminal of the first delay circuit;

a third delay circuit whose input terminal is connected to the output terminal of the line memory;

a second amplifier whose input terminal is connected to the output terminal of the third delay circuit; and a third adder whose first input terminal is connected to the output terminal of the first amplifier and whose second output terminal is inversely connected to the output terminals the second amplifier.

9. An image restoration system as defined in claim 7, wherein said G signal processing circuit comprises:

a line memory and a first delay circuit for receiving the degraded G component signal;

a second delay circuit whose input terminal is connected to the output terminal of the first delay circuit;

a first amplifier whose input terminal is connected to the output terminal of the line memory;

a second amplifier whose input terminal is connected to the output terminal of the first delay circuit;

a first adder whose first input terminal inversely receives the degraded G component signal, whose second input terminal is connected to the output terminal of the first amplifier and whose third input terminal is connected to the output terminal of the second amplifier;

a third amplifier whose input terminal is connected to the output terminal of the line memory;

a fourth amplifier whose input terminal is connected to the output terminal of the first delay circuit;

a third delay circuit whose input terminal is connected to the output terminal of the line memory;

a second adder whose first input terminal is connected to the output terminal of the fourth amplifier, whose second input terminal is connected to the output terminal of the third amplifier and whose third input terminal is inversely connected to the output terminal of the third delay circuit;

a fourth delay circuit whose input terminal is connected to the output terminal of the third delay circuit;

a fifth amplifier whose input terminal is connected to the output terminal of the fourth delay circuit;

a third adder whose first input terminal is connected to the output terminal of the fourth amplifier, whose second input terminal is inversely connected to the output terminals the third delay circuit and whose third input terminal is connected to the output terminal of the fifth amplifier;

a sixth amplifier whose input terminal is connected to the output terminal of the fourth delay circuit;

a fourth adder whose first input terminal is inversely connected to the output terminal of the second delay circuit, whose second input terminal is connected to the output terminal of the second amplifier and whose third input terminal is connected to the output terminal of the sixth amplifier.

10. An image restoration system as defined in claim 7, wherein said B signal processing circuit comprises:

a line memory and a first delay circuit for receiving the B component signal which is decorrelated and restored with a frequency;

a second delay circuit whose input terminal is connected to the output terminal of the first delay circuit;

a first adder whose first input terminal inversely receives the B component signal and whose second input terminal is connected to the output terminal of the line memory;

a first amplifier whose input terminal is connected to the output terminal of the first adder;

a third delay circuit whose input terminal is connected to the output terminal of the line memory;

a second adder whose first input terminal is connected to the output terminal of the line memory and whose second input terminal is inversely connected to the output terminal of the third delay circuit;

a fourth delay circuit whose input terminal is connected to the output terminal of the third delay circuit;

a third adder whose first input terminal is inversely connected to the output terminal of the third delay circuit and whose first output terminal is connected to the output terminal of the fourth delay circuit;

a fourth adder whose first input terminal is inversely connected to the output terminal of the second delay circuit and whose second input terminal is connected to the output terminal of the fourth delay circuit; and a second amplifier whose input terminal is connected to the output terminal of the fourth adder.

11. An image restoration system as defined in claim 7, wherein said signal combination circuit comprises:

a first adder whose first input terminal inversely receives a first R component signal from said R signal processing circuit, whose second input terminal receives a first G component signal from said G signal processing circuit and whose third input terminal inversely receives a first B component signal from said B signal processing circuit;

a second adder whose first input terminal inversely receives a second R component signal from said R signal processing circuit, whose second input terminal receives a second G component signal from said G signal processing circuit and whose third input terminal inversely receives a second B component signal from said B signal processing circuit;

a third adder whose first input terminal inversely receives a third R component signal from said R signal processing circuit, whose second input terminal receives a third G component signal from said G signal processing circuit and whose third input terminal inversely receives a third B component signal from said B signal processing circuit;

a fourth adder whose first input terminal inversely receives the third R component signal from said R signal processing circuit, whose second input terminal receives a fourth G component signal from said G signal processing circuit and whose third input terminal inversely receives a fourth B component signal from said B signal processing circuit;

a first amplifier whose input terminal is connected the output terminal of the first adder;

a second amplifier whose input terminal is connected the output terminal of the second adder;

a third amplifier whose input terminal is connected the output terminal of the third adder; and a fourth amplifier whose input terminal is connected the output terminal of the fourth adder.

12. An image restoration system as defined in claim 2, wherein said third decorrelation module comprises:

an R signal processing circuit for receiving the degraded R component signal, decorrelating the color components between individual lines and outputting four R component signals;

a G signal processing circuit for receiving the degraded G component signal, decorrelating the color components between individual lines and outputting four G component signals;

a B signal processing circuit for receiving the degraded B component signal, decorrelating the color components between individual lines and outputting four B component signals; and a signal combination circuit for combining the signals from said R signal processing circuit, said G signal processing circuit and said B signal processing circuit, decorrelating the color components between individual lines and columns, and outputting the RGB component signals.

13. An image restoration system as defined in claim 12, wherein said R signal processing circuit comprises:

a line memory and a first delay circuit for receiving the degraded R component signal;

a first adder whose first input terminal receives the degraded R component signal and whose second input terminal is inversely connected to the output terminal of the first delay circuit;

a fourth amplifier whose input terminal is connected to the output terminal of the first adder;

a second delay circuit whose input terminal is connected to the output terminal of the first delay circuit;

a fourth adder whose first input terminal is inversely connected to the output terminal of the first delay circuit and whose second input terminal is connected to the output terminal of the second delay circuit;

a third amplifier whose input terminal is connected to the output terminal of the fourth adder;

a third delay circuit whose input terminal is connected to the output terminal of the line memory;

a second amplifier whose input terminal is connected to the output terminal of the third delay circuit;

a first amplifier whose input terminal is connected to the output terminal of the first delay circuit;

a second adder whose first input terminal receives the degraded R component signal, whose second output terminal is inversely connected to the input terminal of the first amplifier and whose third input terminal is inversely connected the output terminal of the second amplifier; and a third adder whose first input terminal is inversely connected to the output terminal of the first amplifier, whose second input terminal is inversely connected to the output terminal of the second amplifier and whose third input terminal is connected to the output of the second delay circuit.

14. An image frequency restoration system as defined in claim 12, wherein said R signal processing circuit comprises:

a line memory and a first delay circuit for receiving the degraded R component signal;

a second delay circuit whose input terminal is connected to the output terminal of the first delay circuit;

a first and a second amplifier whose respective input terminals are connected to the output terminal of the first delay circuit;

a third amplifier whose input terminal is connected to the output terminal of the line memory;

a first adder whose first input terminal receives the degraded R signal, whose second input terminal is connected to the output terminal of the line memory and whose third input terminal is inversely connected to the output terminal of the second amplifier;

a seventh amplifier whose input terminal is connected to the output terminal of the first adder;

a third delay circuit whose input terminal is connected to the output terminal of the line memory;

a fourth amplifier whose input terminal is connected to the output terminal of the third delay circuit;

a second adder whose first input terminal receives the degraded G component signal, whose second input terminal is inversely connected to the output terminal of the first amplifier, whose third input terminal is connected to the output terminal of the third amplifier and whose fourth input terminal is inversely connected to the output terminal of the fourth amplifier;

a fourth delay circuit whose input terminal is connected to the output terminal of the third delay circuit;

a third adder whose first input terminal is connected to the output terminal of the second delay circuit, whose second input terminal is inversely connected to the output terminal of the second amplifier and whose third input terminal is connected to the output terminal of the fourth delay circuit;

a sixth amplifier whose input terminal is connected to the output terminal of the third adder;

a fifth amplifier whose input terminal is connected to the output terminal for the fourth delay circuit; and a fourth adder whose first input terminal is connected to the output terminal of the first amplifier, whose second input terminal is inversely connected to the output terminal of the fourth amplifier and whose third input terminal is connected to the output terminal for the fifth amplifier.

15. An image restoration system as defined in claim 12, wherein said B signal processing circuit comprises:

a line memory, a first delay circuit, a first amplifier and a second amplifier for receiving the degraded B component signal;

a first adder whose first input terminal is connected to the output terminal of the first amplifier and whose second input terminal is connected to the output terminal of the line memory;

a second delay circuit whose input terminal is connected to the output terminal of the first delay circuit;

a third delay circuit whose input terminal is connected to the output terminal of the line memory;

a ninth amplifier whose input terminal is connected to the output terminal of the first adder;

a third amplifier whose input terminal is connected to the output terminal of the line memory;

a fourth amplifier whose input terminal is connected to the output terminal of the third delay circuit;

a second adder whose first input terminal is connected to the output terminal of the second amplifier, whose second input terminal is connected to the output terminal of the third amplifier and whose third input terminal is inversely connected to the output terminal of the fourth amplifier;

a fifth amplifier whose input terminal is connected to the output terminal of the second delay circuit;

a fourth delay circuit whose input terminal is connected to the output terminal of the third delay circuit;

a sixth amplifier whose input terminal is connected to the output terminal of the fourth delay circuit;

a third adder whose first input terminal is connected to the output terminal of the fifth amplifier, whose second output terminal is inversely connected to the output terminal the fourth amplifier and whose third input terminal is connected to the output terminal of the sixth amplifier;

a seventh amplifier whose input terminal is connected to the output terminal of the second delay circuit;

a fourth adder whose first input terminal is connected to the output terminal of the seventh amplifier and whose second input terminal is connected to the output terminal of the fourth delay circuit; and a eighth amplifier whose input terminal is connected to the output terminal of the fourth adder.

16. An image restoration system as defined in claim 12, wherein said signal combination circuit comprises:

a first adder whose first input terminal inversely receives a first R component signal from said R signal processing circuit, whose second input terminal inversely receives a first G component signal from said G signal processing circuit and whose third input terminal receives a first B component signal from said B signal processing circuit;

a second adder whose first input terminal inversely receives a second R component signal from said R signal processing circuit, whose second input terminal inversely receives a second G component signal from said G signal processing circuit and whose third input terminal receives a second B component signal from said B signal processing circuit;

a third adder whose first input terminal inversely receives a third R component signal from said R signal processing circuit, whose second input terminal inversely receives a third G component signal from said G signal processing circuit and whose third input terminal receives a third B component signal from said B signal processing circuit;

a fourth adder whose first input terminal inversely receives the third R component signal from said R signal processing circuit, whose second input terminal inversely receives a fourth G component signal from said G signal processing circuit and whose third input terminal receives a fourth B component signal from said B signal processing circuit;

a first amplifier whose input terminal is connected the output terminal of the first adder;

a second amplifier whose input terminal is connected the output terminal of the second adder;

a third amplifier whose input terminal is connected the output terminal of the third adder; and a fourth amplifier whose input terminal is connected the output terminal of the fourth adder.

17. An image frequency restoration system for a single charge coupled device color video camera comprising:

a decorrelation module for receiving degraded RGB component signals image-processed by the single charge coupled device and outputting individual the RGB component signals decorrelated color components between individual channels; and frequency restoration module for receiving the RGB component signals from said decorrelation module, restoring frequency components lost in channels and outputting the RGB component signals;

wherein said restoration module comprises:
first restoration circuit for receiving a degraded R component signal from said decorrelation module, restoring a frequency component in a channel and outputting a restored R component signal;
second restoration circuit for receiving a degraded G component signal from said decorrelation module, restoring a frequency component in a channel and outputting a restored G component signal; and
third restoration circuit for receiving a degraded B component signal from said decorrelation module, restoring a frequency component in a channel and outputting a restored B component signal,
wherein said first restoration circuit comprises:
signal delay means for receiving and delaying a signal outputted from the decorrelation means, and for outputting twenty five signals of the R components at a time with corresponding delay times;
coefficient multiplexing means for receiving the twenty five signals from said signal delay means and outputting the signals multiplied by filter coefficients corresponding to the signals, respectively; and
restoring signal output means for receiving and multiplexing the signals from said coefficient multiplexing means, and for outputting a signal restored signal.

18. An image restoration system as defined in claim 17, wherein said signal delay means comprises:

first delay means comprising four line memories connected in cascade which delay an output signal from the decorrelation module, respectively;

second delay means comprising five delay circuits connected in parallel which delay the output signal from said decorrelation module and output signals from the line memories of said first delay means, respectively;

third delay means comprising five delay circuits connected in parallel which delay output signals from the delay circuits of said second delay means, respectively;

fourth delay means comprising five delay circuits connected in parallel which delay output signals from the delay circuits of said third delay means, respectively; and fifth delay means comprising five delay circuits connected in parallel which delay output signals from the delay circuits of said fourth delay means, respectively.

19. An image restoration system as defined in claim 18, wherein said coefficient multiplexing means comprises:

first coefficient multiplexing means comprising a first multiplier which multiplies the output signal from said decorrelation means by a corresponding filter coefficient, a second multiplier, a third multiplier, a fourth multiplier and fifth multipliers which multiply output signals from line memories of said first delay means by corresponding filter coefficients, respectively, for outputting five multiplexing signals;

second coefficient multiplexing means comprising a first multiplier, a second multiplier, a third multiplier, a fourth multiplier and fifth multipliers which multiply the output signal from said second delay means by corresponding filter coefficients, respectively, for outputting five multiplexing signals;

third coefficient multiplexing means comprising a first multiplier, a second multiplier, a third multiplier, a fourth multiplier and fifth multipliers which multiply the output signals from said third delay means by corresponding filter coefficients, respectively, for outputting five multiplexing signals;

fourth coefficient multiplexing means comprising a first multiplier, a second multiplier, a third multiplier, a fourth multiplier and fifth multipliers which multiply the output signals from said fourth delay means by corresponding filter coefficients, respectively, for outputting five multiplexing signals;

fifth coefficient multiplexing means comprising a first multiplier, a second multiplier, a third multiplier, a fourth multiplier and fifth multipliers which multiply the output signals from said fifth delay means by corresponding filter coefficients, respectively, for outputting five multiplexing signals.

20. An image restoration system as defined in claim 19, wherein said restoring signal output means comprises:

a first adder summing the multiplexing signal from said first multiplier of the first coefficient multiplexing means, the multiplexing signal from said first multiplier of the second coefficient multiplexing means, the multiplexing signal from said first multiplier of the third coefficient multiplexing means, the multiplexing signal from said first multiplier of the fourth coefficient multiplexing means and the multiplexing signal from said first multiplier of the fifth coefficient multiplexing means;

a second adder summing the multiplexing signal from said second multiplier of the first coefficient multiplexing means, the multiplexing signal from said second multiplier of the second coefficient multiplexing means, the multiplexing signal from said second multiplier of the third coefficient multiplexing means, the multiplexing signal from said second multiplier of the fourth coefficient multiplexing means and the multiplexing signal from said second multiplier of the fifth coefficient multiplexing means;

a third adder summing the multiplexing signal from said third multiplier of the first coefficient multiplexing means, the multiplexing signal from said third multiplier of the second coefficient multiplexing means, the multiplexing signal from said third multiplier of the third coefficient multiplexing means, the multiplexing signal from said third multiplier of the fourth coefficient multiplexing means and the multiplexing signal from said third multiplier of the fifth coefficient multiplexing means;

a fourth adder summing the multiplexing signal from said fourth multiplier of the first coefficient multiplexing means, the multiplexing signal from said fourth multiplier of the second coefficient multiplexing means, the multiplexing signal from said fourth multiplier of the third coefficient multiplexing means, the multiplexing signal from said fourth multiplier of the fourth coefficient multiplexing means and the multiplexing signal from said fourth multiplier of the fifth coefficient multiplexing means;

a fifth adder summing the multiplexing signal from said fifth multiplier of the first coefficient multiplexing means, the multiplexing signal from said fifth multiplier of the second coefficient multiplexing means, the multiplexing signal from said fifth multiplier of the third coefficient multiplexing means, the multiplexing signal from said fifth multiplier of the fourth coefficient multiplexing means and the multiplexing signal from said fifth multiplier of the fifth coefficient multiplexing means.

21. An image frequency restoration system for a single charge coupled device color video camera comprising:

a decorrelation module for receiving degraded RGB component signals image-processed by the single charge coupled device and outputting individual the RGB component signals decorrelated color components between individual channels; and frequency restoration module for receiving the RGB component signals from said decorrelation module, restoring frequency components lost in channels and outputting the RGB component signals wherein said restoration module comprises:

first restoration circuit for receiving a degraded R component signal from said decorrelation module, restoring a frequency component in a channel and outputting a restored R component signal;

second restoration circuit for receiving a degraded G component signal from said decorrelation module, restoring a frequency component in a channel and outputting a restored G component signal; and third restoration circuit for receiving a degraded B component signal from said decorrelation module, restoring a frequency component in a channel and outputting a restored B component signal, wherein said second restoration circuit comprises:

signal delay means for receiving and delaying a signal outputted from the decorrelation means, and for outputting twenty five signals of the G components at a time with corresponding delay times;

coefficient multiplexing means for receiving the twenty five signals from said signal delay means and outputting the signals multiplied by filter coefficients corresponding to the signals, respectively; and restoring signal output means for receiving and multiplexing the signals from said coefficient multiplexing means, and for outputting one signal restored.

22. An image restoration system as defined in claim 21, wherein said signal delay means comprises:

first delay means comprising four line memories connected in cascade which delay an output signal from the decorrelation module, respectively;

second delay means comprising five delay circuits connected in parallel which delay the output signal from said decorrelation module and output signals from the line memories of said first delay means, respectively;

third delay means comprising five delay circuits connected in parallel which delay output signals from the delay circuits of said second delay means, respectively;

fourth delay means comprising five delay circuits connected in parallel which delay output signals from the delay circuits of said third delay means, respectively; and fifth delay means comprising five delay circuits connected in parallel which delay output signals from the delay circuits of said fourth delay means, respectively.

23. An image restoration system as defined in claim 22, wherein said coefficient multiplexing means comprises:

first coefficient multiplexing means comprising a first multiplier which multiplies the output signal from said decorrelation means by a corresponding filter coefficient, a second multiplier, a third multiplier, a fourth multiplier and fifth multipliers which multiply output signals from line memories of said first delay means by corresponding filter coefficients, respectively, for outputting five multiplexing signals;

second coefficient multiplexing means comprising a first multiplier, a second multiplier, a third multiplier, a fourth multiplier and fifth multipliers which multiply the output signal from said second delay means by corresponding filter coefficients, respectively, for outputting five multiplexing signals;

third coefficient multiplexing means comprising a first multiplier, a second multiplier, a third multiplier, a fourth multiplier and fifth multipliers which multiply the output signals from said third delay means by corresponding filter coefficients, respectively, for outputting five multiplexing signals;

fourth coefficient multiplexing means comprising a first multiplier, a second multiplier, a third multiplier, a fourth multiplier and fifth multipliers which multiply the output signals from said fourth delay means by corresponding filter coefficients, respectively, for outputting five multiplexing signals;

fifth coefficient multiplexing means comprising a first multiplier, a second multiplier, a third multiplier, a fourth multiplier and fifth multipliers which multiply the output signals from said fifth delay means by corresponding filter coefficients, respectively, for outputting five multiplexing signals.

24. An image restoration system as defined in claim 23, wherein said restoring signal output means comprises:

a first adder summing the multiplexing signal from said first multiplier of the first coefficient multiplexing means, the multiplexing signal from said first multiplier of the second coefficient multiplexing means, the multiplexing signal from said first multiplier of the third coefficient multiplexing means, the multiplexing signal from said first multiplier of the fourth coefficient multiplexing means and the multiplexing signal from said first multiplier of the fifth coefficient multiplexing means;

a second adder summing the multiplexing signal from said second multiplier of the first coefficient multiplexing means, the multiplexing signal from said second multiplier of the second coefficient multiplexing means, the multiplexing signal from said second multiplier of the third coefficient multiplexing means, the multiplexing signal from said second multiplier of the fourth coefficient multiplexing means and the multiplexing signal from said second multiplier of the fifth coefficient multiplexing means;

a third adder summing the multiplexing signal from said third multiplier of the first coefficient multiplexing means, the multiplexing signal from said third multiplier of the second coefficient multiplexing means, the multiplexing signal from said third multiplier of the third coefficient multiplexing means, the multiplexing signal from said third multiplier of the fourth coefficient multiplexing means and the multiplexing signal from said third multiplier of the fifth coefficient multiplexing means;

a fourth adder summing the multiplexing signal from said fourth multiplier of the first coefficient multiplexing means, the multiplexing signal from said fourth multiplier of the second coefficient multiplexing means, the multiplexing signal from said fourth multiplier of the third coefficient multiplexing means, the multiplexing signal from said fourth multiplier of the fourth coefficient multiplexing means and the multiplexing signal from said fourth multiplier of the fifth coefficient multiplexing means;

a fifth adder summing the multiplexing signal from said fifth multiplier of the first coefficient multiplexing means, the multiplexing signal from said fifth multiplier of the second coefficient multiplexing means, the multiplexing signal from said fifth multiplier of the third coefficient multiplexing means, the multiplexing signal from said fifth multiplier of the fourth coefficient multiplexing means and the multiplexing signal from said fifth multiplier of the fifth coefficient multiplexing means.

25. An image frequency restoration system for a single charge coupled device color video camera comprising:

a decorrelation module for receiving degraded RGB component signals image-processed by the single charge coupled device and outputting individual the RGB component signals decorrelated color components between individual channels; and frequency restoration module for receiving the RGB component signals from said decorrelation module, restoring frequency components lost in channels and outputting the RGB component signals wherein said restoration module comprises:

first restoration circuit for receiving a degraded R component signal from said decorrelation module, restoring a frequency component in a channel and outputting a restored R component signal;

second restoration circuit for receiving a degraded G component signal from said decorrelation module, restoring a frequency component in a channel and outputting a restored G component signal; and third restoration circuit for receiving a degraded B component signal from said decorrelation module, restoring a frequency component in a channel and outputting a restored B component signal, wherein said third restoration circuit comprises:

signal delay means for receiving and delaying a signal outputted from the decorrelation means, and for outputting twenty five signals of the B components at a time with corresponding delay times;

coefficient multiplexing means for receiving the twenty five signals from said signal delay means and outputting the signals multiplied by filter coefficients corresponding to the signals, respectively; and restoring signal output means for receiving and multiplexing the signals from said coefficient multiplexing means, and for outputting one restored signal.

26. An image restoration system as defined in claim 25, wherein said signal delay means comprises:

first delay means comprising four line memories connected in cascade which delay an output signal from the decorrelation module, respectively;

second delay means comprising five delay circuits connected in parallel which delay the output signal from said decorrelation module and output signals from the line memories of said first delay means, respectively;

third delay means comprising five delay circuits connected in parallel which delay output signals from the delay circuits of said second delay means, respectively;

fourth delay means comprising five delay circuits connected in parallel which delay output signals from the delay circuits of said third delay means, respectively; and fifth delay means comprising five delay circuits connected in parallel which delay output signals from the delay circuits of said fourth delay means, respectively.

27. An image restoration system as defined in claim 26, wherein said coefficient multiplexing means comprises:

first coefficient multiplexing means comprising a first multiplier which multiplies the output signal from said decorrelation means by a corresponding filter coefficient, a second multiplier, a third multiplier, a fourth multiplier and fifth multipliers which multiply output signals from line memories of said first delay means by corresponding filter coefficients, respectively, for outputting five multiplexing signals;

second coefficient multiplexing means comprising a first multiplier, a second multiplier, a third multiplier, a fourth multiplier and fifth multipliers which multiply the output signal from said second delay means by corresponding filter coefficients, respectively, for outputting five multiplexing signals;

third coefficient multiplexing means comprising a first multiplier, a second multiplier, a third multiplier, a fourth multiplier and fifth multipliers which multiply the output signals from said third delay means by corresponding filter coefficients, respectively, for outputting five multiplexing signals;

fourth coefficient multiplexing means comprising a first multiplier, a second multiplier, a third multiplier, a fourth multiplier and fifth multipliers which multiply the output signals from said fourth delay means by corresponding filter coefficients, respectively, for outputting five multiplexing signals;

fifth coefficient multiplexing means comprising a first multiplier, a second multiplier, a third multiplier, a fourth multiplier and fifth multipliers which multiply the output signals from said fifth delay means by corresponding filter coefficients, respectively, for outputting five multiplexing signals.

28. An image restoration system as defined in claim 27, wherein said restoring signal output means comprises:

a first adder summing the multiplexing signal from said first multiplier of the first coefficient multiplexing means, the multiplexing signal from said first multiplier of the second coefficient multiplexing means, the multiplexing signal from said first multiplier of the third coefficient multiplexing means, the multiplexing signal from said first multiplier of the fourth coefficient multiplexing means and the multiplexing signal from said first multiplier of the fifth coefficient multiplexing means;

a second adder summing the multiplexing signal from said second multiplier of the first coefficient multiplexing means, the multiplexing signal from said second multiplier of the second coefficient multiplexing means, the multiplexing signal from said second multiplier of the third coefficient multiplexing means, the multiplexing signal from said second multiplier of the fourth coefficient multiplexing means and the multiplexing signal from said second multiplier of the fifth coefficient multiplexing means;

a third adder summing the multiplexing signal from said third multiplier of the first coefficient multiplexing means, the multiplexing signal from said third multiplier of the second coefficient multiplexing means, the multiplexing signal from said third multiplier of the third coefficient multiplexing means, the multiplexing signal from said third multiplier of the fourth coefficient multiplexing means and the multiplexing signal from said third multiplier of the fifth coefficient multiplexing means;

a fourth adder summing the multiplexing signal from said fourth multiplier of the first coefficient multiplexing means, the multiplexing signal from said fourth multiplier of the second coefficient multiplexing means, the multiplexing signal from said fourth multiplier of the third coefficient multiplexing means, the multiplexing signal from said fourth multiplier of the fourth coefficient multiplexing means and the multiplexing signal from said fourth multiplier of the fifth coefficient multiplexing means;

a fifth adder summing the multiplexing signal from said fifth multiplier of the first coefficient multiplexing means, the multiplexing signal from said fifth multiplier of the second coefficient multiplexing means, the multiplexing signal from said fifth multiplier of the third coefficient multiplexing means, the multiplexing signal from said fifth multiplier of the fourth coefficient multiplexing means and the multiplexing signal from said fifth multiplier of the fifth coefficient multiplexing means.

29. A method of image restoration for a single charge coupled device color video camera comprising:

providing individual decorrelated RGB components, including receiving degraded RGB component signals image-processed by the single charge coupled device and outputting the RGB component signals decorrelated color components between individual channels; and restoring frequency components lost in said channels comprising receiving the RGB component signals that have been decorrelated, restoration processing said signals and outputting the RGB component signals, wherein R decorrelation step comprises:

receiving the degraded R component signal, decorrelating the color components between individual lines and outputting a first plurality or a component signals;

receiving the degraded G component signal, decorrelating the color components between individual lines and outputting a second plurality of G component signals;

receiving the degraded B component signal, decorrelating the color components between individual lines and outputting a second plurality of G component signals;

receiving the degraded B component signal, decorrelating the color components between individual lines and outputting a third plurality of B component signals; and combining the signals from said first plurality of R component signals, said second plurality of G component signals and said third plurality of B component signals, decorrelating the color components between individual lines and columns, and outputting the RGB component signals.

30. An image restoration method as defined in claim 29, wherein said R decorrelation step comprises:

receiving the degraded R component signal, decorrelating the color components between individual lines and outputting a first plurality of R component signals;

receiving the degraded G component signal, decorrelating the color components between individual lines and outputting a second plurality of G component signals;

receiving the degraded B component signal, decorrelating the color components between individual lines and outputting a third plurality of B component signals; and combining the signals from said first plurality of R component signals, said second plurality of G component signals and said third plurality of B component signals, decorrelating the color components between individual lines and columns, and outputting the RGB component signals.

31. An image restoration system as defined in claim 30, wherein said B decorrelation step comprises:

receiving the degraded R component signal, decorrelating the color components between individual lines and outputting a first plurality of R component signals;

receiving the degraded G component signal, decorrelating the color components between individual lines and outputting a second plurality of G component signals;

receiving the degraded B component signal, decorrelating the color components between individual lines and outputting a third plurality of B component signals; and combining the signals from said first plurality of R component signals, said second plurality of G component signals and said third plurality of B component signals, decorrelating the color components between individual lines and columns, and outputting the RGB component signals.

32. An image restoration method as defined in claim 29, wherein said G decorrelation step comprises:

receiving the degraded R component signal, decorrelating the color components between individual lines and outputting a first plurality of R component signals;

receiving the degraded G component signal, decorrelating the color components between individual lines and outputting a second plurality of G component signals;

receiving the degraded B component signal, decorrelating the color components between individual lines and outputting a third plurality of B component signals; and combining the signals from said first plurality of R component signals, said second plurality of G component signals and said third plurality of B component signals, decorrelating the color components between individual lines and columns, and outputting the RGB component signals.

* * * * *